US012800730B2

(12) United States Patent
Wan

(10) Patent No.: US 12,800,730 B2
(45) Date of Patent: Nov. 17, 2026

(54) DYNAMIC PULSE CONTROL FOR LiDAR LIGHT SOURCE

(71) Applicant: Innovusion, Inc., Sunnyvale, CA (US)

(72) Inventor: Peng Wan, Fremont, CA (US)

(73) Assignee: SEYOND, INC., Sunnyvale, CA (US)

( * ) Notice: Subject to any disclaimer, the term of this patent is extended or adjusted under 35 U.S.C. 154(b) by 855 days.

(21) Appl. No.: 17/723,239

(22) Filed: Apr. 18, 2022

(65) Prior Publication Data

US 2022/0334223 A1 Oct. 20, 2022

Related U.S. Application Data

(60) Provisional application No. 63/177,354, filed on Apr. 20, 2021.

(51) Int. Cl.

| | |
|---|---|
| ***G01S 7/484*** | (2006.01) |
| ***G01S 7/481*** | (2006.01) |
| ***G01S 7/4865*** | (2020.01) |
| ***G01S 17/89*** | (2020.01) |
| ***G01S 17/931*** | (2020.01) |

(52) U.S. Cl.

CPC ............ *G01S 7/484* (2013.01); *G01S 7/4814* (2013.01); *G01S 7/4817* (2013.01); *G01S 7/4865* (2013.01); *G01S 17/89* (2013.01); *G01S 17/931* (2020.01)

(58) Field of Classification Search

CPC ..... G01S 7/4817; G01S 17/931; G01S 7/4818

See application file for complete search history.

(56) References Cited

U.S. PATENT DOCUMENTS

| | | | |
|---|---|---|---|
| 3,897,150 | A | 7/1975 | Bridges et al. |
| 4,464,048 | A | 8/1984 | Farlow |
| 4,923,263 | A | 5/1990 | Johnson |
| 5,006,721 | A | 4/1991 | Cameron et al. |
| 5,157,451 | A | 10/1992 | Taboada et al. |
| 5,319,434 | A | 6/1994 | Croteau et al. |

(Continued)

FOREIGN PATENT DOCUMENTS

| | | | |
|---|---|---|---|
| CN | 1677050 | A | 10/2005 |
| CN | 204758260 | U | 11/2015 |

(Continued)

OTHER PUBLICATIONS

"Mirrors", Physics LibreTexts, https://phys.libretexts.org/Bookshelves/Optics/Supplemental_Modules_(Components)/Mirrors, (2021), 2 pages.

(Continued)

*Primary Examiner* — Minsun O Harvey
*Assistant Examiner* — Alexander Ehrlich
(74) *Attorney, Agent, or Firm* — MASCHOFF BRENNAN; Ran Pang; Liang Huang

(57) ABSTRACT

A method for performing dynamic pulse control of a fiber laser in a light detection and ranging (LiDAR) scanning system is provided. The method comprises switching pump power that is deliverable to a first power amplification medium carrying seed laser light having a first triggering frequency; and adjusting the seed laser light to have a second triggering frequency different from the first triggering frequency. Switching of the pump power and adjusting of the seed laser light are timed to occur at different times having a first time difference.

22 Claims, 18 Drawing Sheets

(56) References Cited

U.S. PATENT DOCUMENTS 5,369,661 A 11/1994 Yamaguchi et al.
5,442,358 A 8/1995 Keeler et al.
5,546,188 A 8/1996 Wangler et al.
5,579,153 A 11/1996 Laming et al.
5,657,077 A 8/1997 Deangelis et al.
5,793,491 A 8/1998 Wangler et al.
5,838,239 A 11/1998 Stern et al.
5,864,391 A 1/1999 Hosokawa et al.
5,867,305 A 2/1999 Waarts et al.
5,926,259 A 7/1999 Bamberger et al.
5,936,756 A 8/1999 Nakajima
6,163,378 A 12/2000 Khoury
6,317,202 B1 11/2001 Hosokawa et al.
6,594,000 B2 7/2003 Green et al.
6,650,404 B1 11/2003 Crawford
6,950,733 B2 9/2005 Stopczynski
7,128,267 B2 10/2006 Reichenbach et al.
7,202,941 B2 4/2007 Munro
7,345,271 B2 3/2008 Boehlau et al.
7,382,442 B2 6/2008 Adachi et al.
7,440,084 B2 10/2008 Kane
7,440,175 B2 10/2008 Di et al.
7,489,865 B2 2/2009 Varshineya et al.
7,502,395 B2 3/2009 Cheng et al.
7,508,496 B2 3/2009 Mettenleiter et al.
7,576,837 B2 8/2009 Liu et al.
7,583,364 B1 9/2009 Mayor et al.
7,830,527 B2 11/2010 Chen et al.
7,835,068 B1 11/2010 Brooks et al.
7,847,235 B2 12/2010 Krupkin et al.
7,880,866 B2 2/2011 Tanaka et al.
7,936,448 B2 5/2011 Albuquerque et al.
7,969,558 B2 6/2011 Hall
7,982,861 B2 7/2011 Abshire et al.
8,072,582 B2 12/2011 Meneely
8,471,895 B2 6/2013 Banks
8,736,818 B2 5/2014 Weimer et al.
8,749,764 B2 6/2014 Hsu
8,812,149 B2 8/2014 Doak
8,994,928 B2 3/2015 Shiraishi
9,041,762 B2 5/2015 Bai et al.
9,048,616 B1 6/2015 Robinson
9,086,273 B1 7/2015 Gruver et al.
9,121,703 B1 9/2015 Droz et al.
9,194,701 B2 11/2015 Bosch
9,255,790 B2 2/2016 Zhu
9,279,662 B2 3/2016 Steffey et al.
9,300,321 B2 3/2016 Zalik et al.
9,304,316 B2 4/2016 Weiss et al.
9,316,724 B2 4/2016 Gehring et al.
9,354,485 B2 5/2016 Fermann et al.
9,510,505 B2 12/2016 Halloran et al.
9,575,184 B2 2/2017 Gilliland et al.
9,605,998 B2 3/2017 Nozawa
9,621,876 B2 4/2017 Federspiel
9,638,799 B2 5/2017 Goodwin et al.
9,696,426 B2 7/2017 Zuk
9,702,966 B2 7/2017 Batcheller et al.
9,804,264 B2 10/2017 Villeneuve et al.
9,810,786 B1* 11/2017 Welford .................. G01S 7/484
9,823,353 B2 11/2017 Eichenholz et al.
9,869,754 B1 1/2018 Campbell et al.
9,880,263 B2 1/2018 Droz et al.
9,880,278 B2 1/2018 Uffelen et al.
9,885,778 B2 2/2018 Dussan
9,897,689 B2 2/2018 Dussan
9,915,726 B2 3/2018 Bailey et al.
9,927,915 B2 3/2018 Frame et al.
10,042,159 B2 8/2018 Dussan et al.
10,061,019 B1 8/2018 Campbell et al.
10,073,166 B2 9/2018 Dussan
10,094,925 B1 10/2018 LaChapelle
10,157,630 B2 12/2018 Vaughn et al.
10,185,027 B2 1/2019 O'Keeffe
10,191,155 B2 1/2019 Curatu
10,215,847 B2 2/2019 Scheim et al.
10,295,656 B1 5/2019 Li et al.
10,310,058 B1 6/2019 Campbell et al.
10,324,170 B1 6/2019 Enberg, Jr. et al.
10,324,185 B2 6/2019 McWhirter et al.
10,393,877 B2 8/2019 Hall et al.
10,422,865 B2 9/2019 Irish et al.
10,429,495 B1 10/2019 Wang et al.
10,451,716 B2 10/2019 Hughes et al.
10,502,831 B2 12/2019 Eichenholz
10,557,923 B2 2/2020 Watnik et al.
10,557,940 B2 2/2020 Eichenholz et al.
10,571,567 B2 2/2020 Campbell et al.
10,578,720 B2 3/2020 Hughes et al.
10,591,600 B2 3/2020 Villeneuve et al.
10,627,491 B2 4/2020 Hall et al.
10,641,872 B2 5/2020 Dussan et al.
10,663,564 B2 5/2020 LaChapelle
10,663,585 B2 5/2020 McWhirter
10,663,596 B2 5/2020 Dussan et al.
10,684,360 B2 6/2020 Campbell
10,727,643 B1 7/2020 Williams et al.
10,732,281 B2 8/2020 LaChapelle
10,908,262 B2 2/2021 Dussan
10,969,475 B2 4/2021 Li et al.
10,983,218 B2 4/2021 Hall et al.
11,002,835 B2 5/2021 Pan et al.
11,009,605 B2 5/2021 Li et al.
11,016,192 B2 5/2021 Pacala et al.
11,035,935 B2 6/2021 Hinderling
11,289,873 B2 3/2022 Zhang et al.
2002/0136251 A1 9/2002 Green et al.
2004/0135992 A1 7/2004 Munro
2005/0033497 A1 2/2005 Stopczynski
2005/0190424 A1 9/2005 Reichenbach et al.
2005/0195383 A1 9/2005 Breed et al.
2006/0071846 A1 4/2006 Yanagisawa et al.
2006/0132752 A1 6/2006 Kane
2007/0091948 A1 4/2007 Di et al.
2007/0216995 A1 9/2007 Bollond et al.
2008/0174762 A1 7/2008 Liu et al.
2008/0193135 A1 8/2008 Du et al.
2008/0285602 A1* 11/2008 Nagai .................. H01S 3/2366
372/20
2009/0010644 A1 1/2009 Varshneya et al.
2009/0051926 A1 2/2009 Chen
2009/0059201 A1 3/2009 Willner et al.
2009/0067453 A1 3/2009 Mizuuchi et al.
2009/0147239 A1 6/2009 Zhu
2009/0262760 A1 10/2009 Krupkin et al.
2009/0316134 A1 12/2009 Michael et al.
2010/0006760 A1 1/2010 Lee et al.
2010/0020306 A1 1/2010 Hall
2010/0027602 A1 2/2010 Abshire et al.
2010/0045965 A1 2/2010 Meneely
2010/0053715 A1 3/2010 O'Neill et al.
2010/0128109 A1 5/2010 Banks
2010/0271614 A1 10/2010 Albuquerque et al.
2011/0181864 A1 7/2011 Schmitt et al.
2012/0038903 A1 2/2012 Weimer et al.
2012/0124113 A1 5/2012 Zalik et al.
2012/0221142 A1 8/2012 Doak
2013/0107016 A1 5/2013 Federspeil
2013/0116971 A1 5/2013 Retkowski et al.
2013/0241761 A1 9/2013 Cooper et al.
2013/0293867 A1 11/2013 Hsu et al.
2013/0293946 A1 11/2013 Fermann et al.
2013/0329279 A1 12/2013 Nati et al.
2013/0342822 A1 12/2013 Shiraishi
2014/0078514 A1 3/2014 Zhu
2014/0104594 A1 4/2014 Gammenthaler
2014/0347650 A1 11/2014 Bosch
2014/0350836 A1 11/2014 Stettner et al.
2015/0078123 A1 3/2015 Batcheller et al.
2015/0084805 A1 3/2015 Dawber
2015/0109603 A1 4/2015 Kim et al.
2015/0116692 A1 4/2015 Zuk et al.
2015/0139259 A1 5/2015 Robinson
2015/0158489 A1 6/2015 Oh et al.

(56) References Cited

U.S. PATENT DOCUMENTS

2015/0338270 A1 11/2015 Williams et al.
2015/0355327 A1 12/2015 Goodwin et al.
2016/0003946 A1 1/2016 Gilliland et al.
2016/0006914 A1 1/2016 Neumann
2016/0047896 A1 2/2016 Dussan
2016/0047900 A1 2/2016 Dussan
2016/0061655 A1 3/2016 Nozawa
2016/0061935 A1 3/2016 Mccloskey et al.
2016/0100521 A1 4/2016 Halloran et al.
2016/0117048 A1 4/2016 Frame et al.
2016/0172819 A1 6/2016 Ogaki
2016/0178736 A1 6/2016 Chung
2016/0226210 A1 8/2016 Zayhowski et al.
2016/0245902 A1 8/2016 Natnik
2016/0291134 A1 10/2016 Droz et al.
2016/0313445 A1 10/2016 Bailey et al.
2016/0327646 A1 11/2016 Scheim et al.
2016/0377721 A1 12/2016 Lardin et al.
2017/0003116 A1 1/2017 Yee et al.
2017/0153319 A1 6/2017 Villeneuve et al.
2017/0242104 A1 8/2017 Dussan
2017/0299721 A1 10/2017 Eichenholz et al.
2017/0307738 A1 10/2017 Schwarz et al.
2017/0365105 A1 12/2017 Rao et al.
2018/0040171 A1 2/2018 Kundu et al.
2018/0050704 A1 2/2018 Tascione et al.
2018/0069367 A1 3/2018 Villeneuve et al.
2018/0152691 A1 5/2018 Pacala et al.
2018/0156896 A1 6/2018 O'Keeffe
2018/0158471 A1 6/2018 Vaughn et al.
2018/0164439 A1 6/2018 Droz et al.
2018/0188355 A1 7/2018 Bao et al.
2018/0188357 A1 7/2018 Li et al.
2018/0188358 A1 7/2018 Li et al.
2018/0188371 A1 7/2018 Bao et al.
2018/0210084 A1 7/2018 Zwölfer et al.
2018/0275274 A1 9/2018 Bao et al.
2018/0284241 A1 10/2018 Campbell et al.
2018/0284242 A1 10/2018 Campbell
2018/0284286 A1 10/2018 Eichenholz et al.
2018/0329060 A1 11/2018 Pacala et al.
2018/0359460 A1 12/2018 Pacala et al.
2019/0025428 A1 1/2019 Li et al.
2019/0107607 A1 4/2019 Danziger
2019/0107623 A1 4/2019 Campbell et al.
2019/0120942 A1 4/2019 Zhang et al.
2019/0120962 A1 4/2019 Gimpel et al.
2019/0154804 A1 5/2019 Eichenholz
2019/0154807 A1 5/2019 Steinkogler et al.
2019/0212416 A1 7/2019 Li et al.
2019/0250254 A1 8/2019 Campbell et al.
2019/0257924 A1 8/2019 Li et al.
2019/0265334 A1 8/2019 Zhang et al.
2019/0265336 A1 8/2019 Zhang et al.
2019/0265337 A1 8/2019 Zhang et al.
2019/0265339 A1 8/2019 Zhang et al.
2019/0277952 A1 9/2019 Beuschel et al.
2019/0277953 A1 9/2019 Li et al.
2019/0310368 A1 10/2019 LaChapelle
2019/0369215 A1 12/2019 Wang et al.
2019/0369258 A1 12/2019 Hall et al.
2019/0383915 A1 12/2019 Li et al.
2020/0142070 A1 5/2020 Hall et al.
2020/0256964 A1 8/2020 Campbell et al.
2020/0284906 A1 9/2020 Eichenholz et al.
2020/0319310 A1 10/2020 Hall et al.
2020/0358246 A1* 11/2020 Williams .............. G01S 7/4814
2020/0400798 A1 12/2020 Rezk et al.
2021/0088630 A9 3/2021 Zhang

FOREIGN PATENT DOCUMENTS

CN 204885804 U 12/2015
CN 108594206 B 4/2020
CN 115267727 A 11/2022
CN 223296134 U 9/2025
EP 0 757 257 A2 2/1997
EP 1113540 A1 * 7/2001 ....... H01S 3/094003
EP 1 237 305 A2 9/2002
EP 1113540 B1 5/2006
EP 1 923 721 A1 5/2008
EP 2 157 445 A2 2/2010
EP 2 395 368 A1 12/2011
EP 2 889 642 A1 7/2015
GB 1 427 164 A 3/1976
GB 2000411 1/1979
JP 2007144667 A 6/2007
JP 2010035385 A 2/2010
JP 2017-003347 A 1/2017
JP 2017-138301 A 8/2017
KR 20100096931 A 9/2010
KR 10-2012-0013515 A 2/2012
KR 10-2013-0068224 A 6/2013
KR 10-2018-0107673 A 10/2018
WO 02101408 A1 12/2002
WO 2017/110417 A1 6/2017
WO 2018/125725 A1 7/2018
WO 2018/129410 A1 7/2018
WO 2018126248 A1 7/2018
WO 2018129408 A1 7/2018
WO 2018129409 A1 7/2018
WO 2018175990 9/2018
WO 2018182812 A2 10/2018
WO 2019079642 4/2019
WO 2019165095 8/2019
WO 2019165289 A1 8/2019
WO 2019165294 8/2019
WO 2020013890 A2 1/2020

OTHER PUBLICATIONS

"Why Wavelengths Matter in Fiber Optics", FirstLight, https://www.firstlight.net/why-wavelengths-matter-in-fiber-optics/, (2021), 5 pages.
Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.

(56) References Cited

OTHER PUBLICATIONS

International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D Lidar imager based on pixel-by-pixel scanning and DS-OCDMA," p. Proceedings of SPIE [Proceedings of SPIE ISSN 0277-786x vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airbome, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
International Search Report and Written Opinion, dated Jan. 2, 2023, for International Application No. PCT/US2022/025247, 14 pages.
Office Action and Search Report received for Chinese Application No. 202280028640.6, mailed on Mar. 24, 2026, 20 pages (10 pages of original office action and 10 pages of English Translation).
Second Office Action received for Chinese Application No. 202280028640.6, mailed on Sep. 14, 2026, 16 pages (8 pages of original office action and 8 pages of English Translation).

* cited by examiner

DYNAMIC PULSE CONTROL FOR LiDAR LIGHT SOURCE

CROSS-REFERENCE TO RELATED APPLICATIONS

This application claims priority to U.S. Provisional Patent Application Ser. No. 63/177,354, filed Apr. 20, 2021, entitled "DYNAMIC PULSE CONTROL FOR LIDAR LIGHT SOURCE," the content of which is hereby incorporated by reference for all purposes.

FIELD OF THE TECHNOLOGY

This disclosure relates generally to a light source used for optical scanning and, more particularly, to performing dynamic pulse control of a fiber laser used in a light detection and ranging system.

BACKGROUND

Light detection and ranging (LiDAR) systems use light pulses to create an image or point cloud of the external environment. Some typical LiDAR systems include a light source, a light transmitter, a light steering system, and a light detector. The light source generates a light beam that is directed by the light steering system in particular directions when being transmitted from the LiDAR system. When a transmitted light beam is scattered by an object, a portion of the scattered light returns to the LiDAR system as a return light pulse. The light detector detects the return light pulse. Using the difference between the time that the return light pulse is detected and the time that a corresponding light pulse in the light beam is transmitted, the LiDAR system can determine the distance to the object using the speed of light. The light steering system can direct light beams along different paths to allow the LiDAR system to scan the surrounding environment and produce images or point clouds. LiDAR systems can also use techniques other than time-of-flight and scanning to measure the surrounding environment.

SUMMARY

In one embodiment, a method for performing dynamic pulse control of a fiber laser in a light detection and ranging (LiDAR) scanning system is provided. The method comprises switching pump power that is deliverable to a first power amplification medium carrying seed laser light having a first triggering frequency; and adjusting the seed laser light to have a second triggering frequency different from the first triggering frequency. Switching of the pump power and adjusting of the seed laser light are timed to occur at different times having a first time difference.

In one embodiment, a system for performing dynamic pulse control of a fiber laser in a light detection and ranging (LiDAR) scanning system is provided. The system comprises a first pump controller configured to switch pump power that is deliverable to a first power amplification medium carrying seed laser light having a first triggering frequency; and a seed controller configured to adjust the seed laser light to have a second triggering frequency different from the first triggering frequency. Switching the pump power and adjusting the seed laser light are timed to occur at different times having a first time difference.

Embodiments of the methods and systems provided in the present disclosure can reduce or elimination a significant portion of the pulse energy fluctuations of the output amplified laser light of the fiber laser. Further, the embodiments of the methods and systems provided in the present disclosure can reduce the settling time of the pulse energy fluctuations. Thus, the output amplifier laser light can respond rapidly to input changes including changing the seed laser's triggering frequency and/or the changing the pump power. The rapid fiber laser output response facilitates a LiDAR system to switch, smoothly and rapidly, between scanning a region-of-interest (ROI) area and scanning a non-ROI area. Further, the rapid fiber laser output response can also improve the fiber laser efficiency and reduce unnecessary energy consumption.

BRIEF DESCRIPTION OF THE DRAWINGS

The present application can be best understood by reference to the figures described below taken in conjunction with the accompanying drawing figures, in which like parts may be referred to by like numerals.

DETAILED DESCRIPTION

Figure 1:
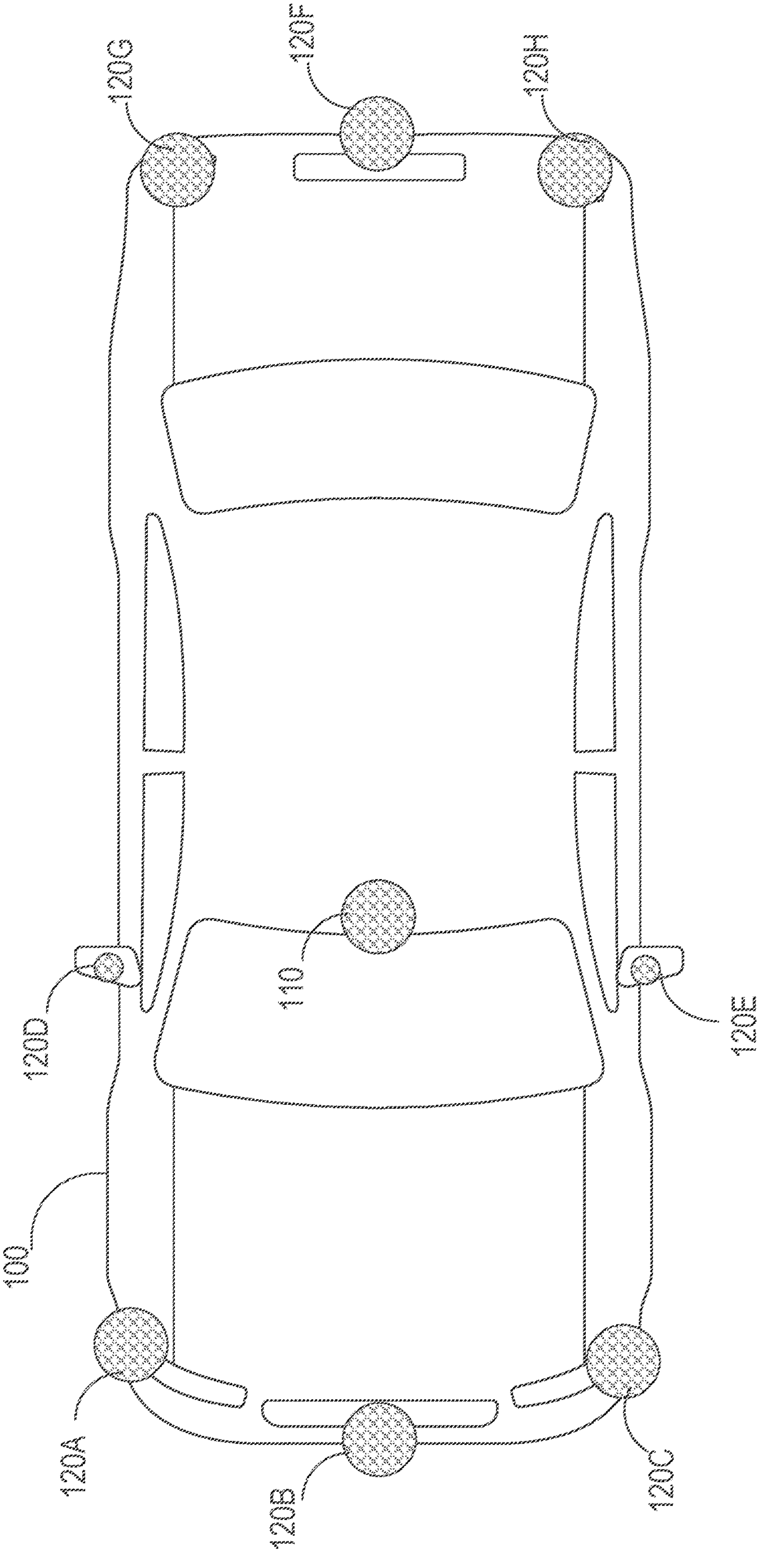
FIG. 1 illustrates one or more exemplary LiDAR systems disposed or included in a motor vehicle.

To provide a more thorough understanding of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the disclosure may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

Although the following description uses terms "first," "second," etc. to describe various elements, these elements should not be limited by the terms. These terms are only used to distinguish one element from another. For example, a first pump could be termed a second pump and, similarly, a second pump could be termed a first pump, without departing from the scope of the various described examples. The first pump and the second pump can both be pumps and, in some cases, can be separate and different pumps.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the following disclosure, numerous references may be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, PLD, DSP, x86, ARM, RISC-V, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices or network platforms, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

A conventional fiber laser typically cannot rapidly change operational characteristics of its output laser light. A fiber laser usually includes a seed laser and a power pump. The seed laser generates seed laser light at the desired signal wavelength (e.g., 1550 nm). The power pump generates pump laser light to provide power to a fiber laser amplifier. The fiber laser amplifier is typically a rare-earth doped optical fiber. The seed laser light and the pump laser light are combined and provided to the fiber laser amplifier. The seed laser light is thus amplified through interaction with the dopant ions in the doped optical fiber. Amplification is achieved by stimulated emission of photons from dopant ions in the doped optical fiber. The pump laser light excites dopant ions into an upper energy level from where they can decay via stimulated emission of a photon at the desired signal wavelength back to a lower energy level.

Due to the excitation of the dopant ions and due to the long time for decay, a fiber laser amplifier can store energy during a period of time. As a result, the fiber laser's output pulse energy may not respond rapidly to its input signal change. As one example, a seed laser is triggered at a certain frequency to generate seed laser light. The triggering frequency may change from time to time. For instance, if a LiDAR system is configured to scan a region-of-interest (ROI), the triggering frequency may need to be increased to increase the scanning resolution, and vice versa. In one example, the triggering frequency may be changed from 300 kHz to 600 kHz. When such a change occurs, the pulse energy of the fiber laser's output laser light may have significant fluctuations (e.g., doubled) before it can be stabilized again.

In another example, the output laser light of the fiber laser may not respond to the change of the pump power rapidly. In a fiber laser, the power provided by a pump may also change from time to time. For instance, the pump may be turned off suddenly and thus no pump laser light is provided to amplify the seed laser light. The pump may also reduce the power provided. But due to the stored energy in the fiber laser amplifier, the output pulse energy of the fiber laser can only gradually reduce to zero. In some situations, the time for the output pulse energy to reduce to zero can be greater than 100 microseconds. In applications where the fiber laser needs to rapidly change its output in response to the input control signals, the delay in the output response may not be acceptable or desirable. Thus, there is a need to both reduce the fiber laser output pulse energy fluctuations and to reduce the output pulse energy settling time when one or more inputs to the fiber laser change.

Methods and systems provided in the present disclosure can reduce or elimination a significant portion of the pulse energy fluctuations of the output amplified laser light of the fiber laser. Further, methods and systems provided in the present disclosure can reduce the settling time of the output amplified laser light. Thus, the output amplifier laser light can respond rapidly to the input changes including changing the seed laser's triggering frequency and/or changing the pump power. The rapid fiber laser output response facilitates a LiDAR system to smoothly and rapidly switch its scanning between a region-of-interest (ROI) area and a non-ROI area. Further, the rapid fiber laser output response can also improve the fiber laser efficiency and reduce unnecessary energy consumption.

FIG. 1 illustrates one or more exemplary LiDAR systems 110 disposed or included in a motor vehicle 100. Motor vehicle 100 can be a vehicle having any automated level. For example, motor vehicle 100 can be a partially automated vehicle, a highly automated vehicle, a fully automated vehicle, or a driverless vehicle. A partially automated vehicle can perform some driving functions without a human driver's intervention. For example, a partially automated vehicle can perform blind-spot monitoring, lane keeping and/or lane changing operations, automated emergency braking, smart cruising and/or traffic following, or the like. Certain operations of a partially automated vehicle may be limited to specific applications or driving scenarios (e.g., limited to only freeway driving). A highly automated vehicle can generally perform all operations of a partially automated vehicle but with less limitations. A highly automated vehicle can also detect its own limits in operating the vehicle and ask the driver to take over the control of the vehicle when necessary. A fully automated vehicle can perform all vehicle operations without a driver's intervention but can also detect its own limits and ask the driver to take over when necessary. A driverless vehicle can operate on its own without any driver intervention.

In typical configurations, motor vehicle 100 comprises one or more LiDAR systems 110 and 120A-H. Each of LiDAR systems 110 and 120A-H can be a scanning-based LiDAR system and/or a non-scanning LiDAR system (e.g., a flash LiDAR). A scanning-based LiDAR system scans one or more light beams in one or more directions (e.g., horizontal and vertical directions) to detect objects in a field-of-view (FOV). A non-scanning based LiDAR system transmits laser light to illuminate an FOV without scanning. For example, a flash LiDAR is a type of non-scanning based LiDAR system. A flash LiDAR can transmit laser light to simultaneously illuminate an FOV using a single light pulse or light shot.

A LiDAR system is often an essential sensor of a vehicle that is at least partially automated. In one embodiment, as shown in FIG. 1, motor vehicle 100 may include a single LiDAR system 110 (e.g., without LiDAR systems 120A-H) disposed at the highest position of the vehicle (e.g., at the vehicle roof). Disposing LiDAR system 110 at the vehicle roof facilitates a 360-degree scanning around vehicle 100. In some other embodiments, motor vehicle 100 can include multiple LiDAR systems, including two or more of systems 110 and/or 120A-H. As shown in FIG. 1, in one embodiment, multiple LiDAR systems 110 and/or 120A-H are attached to vehicle 100 at different locations of the vehicle. For example, LiDAR system 120A is attached to vehicle 100 at the front right corner; LiDAR system 120B is attached to vehicle 100 at the front center; LiDAR system 120C is attached to vehicle 100 at the front left corner; LiDAR system 120D is attached to vehicle 100 at the right-side rear view mirror; LiDAR system 120E is attached to vehicle 100 at the left-side rear view mirror; and/or LiDAR system 120F is attached to vehicle 100 at the back center. In some embodiments, LiDAR systems 110 and 120A-H are independent LiDAR systems having their own respective laser sources, control electronics, transmitters, receivers, and/or steering mechanisms. In other embodiments, some of LiDAR systems 110 and 120A-H can share one or more components, thereby forming a distributed sensor system. In one example, optical fibers are used to deliver laser light from a centralized laser source to all LiDAR systems. It is understood that one or more LiDAR systems can be distributed and attached to a vehicle in any desired manner and FIG. 1 only illustrates one embodiment. As another example, LiDAR systems 120D and 120E may be attached to the B-pillars of vehicle 100 instead of the rear-view mirrors. As another example, LiDAR system 120B may be attached to the windshield of vehicle 100 instead of the front bumper.

Figure 2:
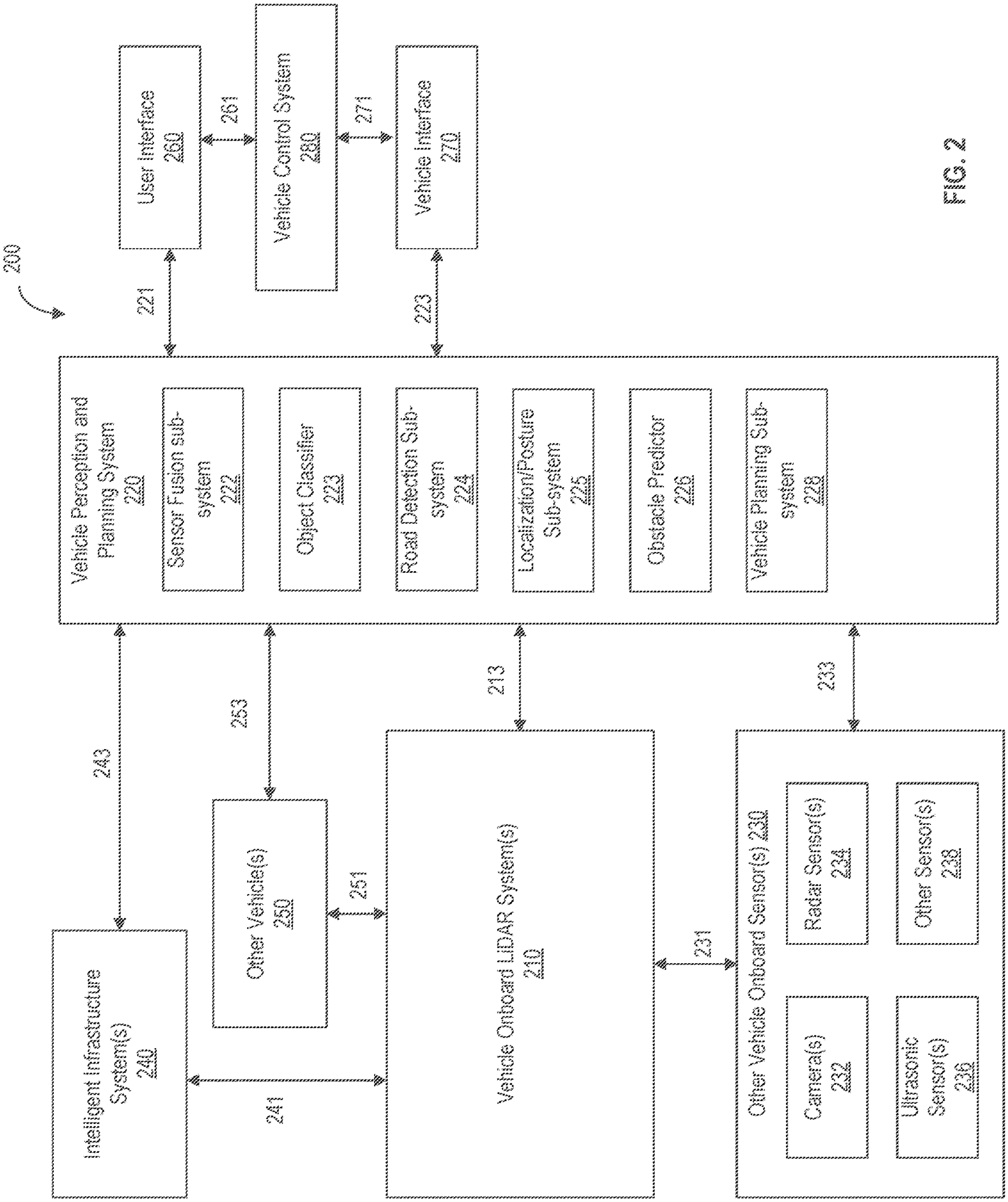
FIG. 2 is a block diagram illustrating interactions between an exemplary LiDAR system and multiple other systems including a vehicle perception and planning system.

FIG. 2 is a block diagram 200 illustrating interactions between vehicle onboard LiDAR system(s) 210 and multiple other systems including a vehicle perception and planning system 220. LiDAR system(s) 210 can be mounted on or integrated to a vehicle. LiDAR system(s) 210 include sensor (s) that scan laser light to the surrounding environment to measure the distance, angle, and/or velocity of objects. Based on the scattered light that returned to LiDAR system (s) 210, it can generate sensor data (e.g., image data or 3D point cloud data) representing the perceived external environment.

LiDAR system(s) 210 can include one or more of short-range LiDAR sensors, medium-range LiDAR sensors, and long-range LiDAR sensors. A short-range LiDAR sensor measures objects located up to about 20-40 meters from the LiDAR sensor. Short-range LiDAR sensors can be used for, e.g., monitoring nearby moving objects (e.g., pedestrians crossing street in a school zone), parking assistance applications, or the like. A medium-range LiDAR sensor measures objects located up to about 100-150 meters from the LiDAR sensor. Medium-range LiDAR sensors can be used for, e.g., monitoring road intersections, assistance for merging onto or leaving a freeway, or the like. A long-range LiDAR sensor measures objects located up to about 150-300 meters. Long-range LiDAR sensors are typically used when a vehicle is travelling at high speed (e.g., on a freeway), such that the vehicle's control systems may only have a few seconds (e.g., 6-8 seconds) to respond to any situations detected by the LiDAR sensor. As shown in FIG. 2, in one embodiment, the LiDAR sensor data can be provided to vehicle perception and planning system 220 via a communication path 213 for further processing and controlling the vehicle operations. Communication path 213 can be any wired or wireless communication links that can transfer data.

With reference still to FIG. 2, in some embodiments, other vehicle onboard sensor(s) 230 are used to provide additional sensor data separately or together with LiDAR system(s) 210. Other vehicle onboard sensors 230 may include, for example, one or more camera(s) 232, one or more radar(s) 234, one or more ultrasonic sensor(s) 236, and/or other sensor(s) 238. Camera(s) 232 can take images and/or videos of the external environment of a vehicle. Camera(s) 232 can take, for example, high-definition (HD) videos having millions of pixels in each frame. A camera produces monochrome or color images and videos. Color information may be important in interpreting data for some situations (e.g., interpreting images of traffic lights). Color information may not be available from other sensors such as LiDAR or radar sensors. Camera(s) 232 can include one or more of narrow-focus cameras, wider-focus cameras, side-facing cameras, infrared cameras, fisheye cameras, or the like. The image and/or video data generated by camera(s) 232 can also be provided to vehicle perception and planning system 220 via communication path 233 for further processing and controlling the vehicle operations. Communication path 233 can be any wired or wireless communication links that can transfer data.

Other vehicle onboard sensor(s) 230 can also include radar sensor(s) 234. Radar sensor(s) 234 use radio waves to determine the range, angle, and velocity of objects. Radar sensor(s) 234 produce electromagnetic waves in the radio or microwave spectrum. The electromagnetic waves reflect off an object and some of the reflected waves return to the radar sensor, thereby providing information about the object's position and velocity. Radar sensor(s) 234 can include one or more of short-range radar(s), medium-range radar(s), and long-range radar(s). A short-range radar measures objects located at about 0.1-30 meters from the radar. A short-range radar is useful in detecting objects located nearby the vehicle, such as other vehicles, buildings, walls, pedestrians, bicyclists, etc. A short-range radar can be used to detect a blind spot, assist in lane changing, provide rear-end collision warning, assist in parking, provide emergency braking, or the like. A medium-range radar measures objects located at about 30-80 meters from the radar. A long-range radar measures objects located at about 80-200 meters. Medium- and/or long-range radars can be useful in, for example, traffic following, adaptive cruise control, and/or highway automatic braking. Sensor data generated by radar sensor(s) 234 can also be provided to vehicle perception and planning system 220 via communication path 233 for further processing and controlling the vehicle operations.

Other vehicle onboard sensor(s) 230 can also include ultrasonic sensor(s) 236. Ultrasonic sensor(s) 236 use acoustic waves or pulses to measure object located external to a vehicle. The acoustic waves generated by ultrasonic sensor (s) 236 are transmitted to the surrounding environment. At least some of the transmitted waves are reflected off an object and return to the ultrasonic sensor(s) 236. Based on the return signals, a distance of the object can be calculated. Ultrasonic sensor(s) 236 can be useful in, for example, check blind spot, identify parking spots, provide lane changing assistance into traffic, or the like. Sensor data generated by ultrasonic sensor(s) 236 can also be provided to vehicle perception and planning system 220 via communication path 233 for further processing and controlling the vehicle operations.

In some embodiments, one or more other sensor(s) 238 may be attached in a vehicle and may also generate sensor data. Other sensor(s) 238 may include, for example, global positioning systems (GPS), inertial measurement units (IMU), or the like. Sensor data generated by other sensor(s) 238 can also be provided to vehicle perception and planning system 220 via communication path 233 for further processing and controlling the vehicle operations. It is understood that communication path 233 may include one or more communication links to transfer data between the various sensor(s) 230 and vehicle perception and planning system 220.

In some embodiments, as shown in FIG. 2, sensor data from other vehicle onboard sensor(s) 230 can be provided to vehicle onboard LiDAR system(s) 210 via communication path 231. LiDAR system(s) 210 may process the sensor data from other vehicle onboard sensor(s) 230. For example, sensor data from camera(s) 232, radar sensor(s) 234, ultrasonic sensor(s) 236, and/or other sensor(s) 238 may be correlated or fused with sensor data LiDAR system(s) 210, thereby at least partially offloading the sensor fusion process performed by vehicle perception and planning system 220. It is understood that other configurations may also be implemented for transmitting and processing sensor data from the various sensors (e.g., data can be transmitted to a cloud service for processing and then the processing results can be transmitted back to the vehicle perception and planning system 220).

With reference still to FIG. 2, in some embodiments, sensors onboard other vehicle(s) 250 are used to provide additional sensor data separately or together with LiDAR system(s) 210. For example, two or more nearby vehicles may have their own respective LiDAR sensor(s), camera(s), radar sensor(s), ultrasonic sensor(s), etc. Nearby vehicles can communicate and share sensor data with one another. Communications between vehicles are also referred to as V2V (vehicle to vehicle) communications. For example, as shown in FIG. 2, sensor data generated by other vehicle(s) 250 can be communicated to vehicle perception and planning system 220 and/or vehicle onboard LiDAR system(s) 210, via communication path 253 and/or communication path 251, respectively. Communication paths 253 and 251 can be any wired or wireless communication links that can transfer data.

Sharing sensor data facilitates a better perception of the environment external to the vehicles. For instance, a first vehicle may not sense a pedestrian that is a behind a second vehicle but is approaching the first vehicle. The second vehicle may share the sensor data related to this pedestrian with the first vehicle such that the first vehicle can have additional reaction time to avoid collision with the pedestrian. In some embodiments, similar to data generated by sensor(s) 230, data generated by sensors onboard other vehicle(s) 250 may be correlated or fused with sensor data generated by LiDAR system(s) 210, thereby at least partially offloading the sensor fusion process performed by vehicle perception and planning system 220.

In some embodiments, intelligent infrastructure system(s) 240 are used to provide sensor data separately or together with LiDAR system(s) 210. Certain infrastructures may be configured to communicate with a vehicle to convey information and vice versa. Communications between a vehicle and infrastructures are generally referred to as V2I (vehicle to infrastructure) communications. For example, intelligent infrastructure system(s) 240 may include an intelligent traffic light that can convey its status to an approaching vehicle in a message such as "changing to yellow in 5 seconds." Intelligent infrastructure system(s) 240 may also include its own LiDAR system mounted near an intersection such that it can convey traffic monitoring information to a vehicle. For example, a left-turning vehicle at an intersection may not have sufficient sensing capabilities because some of its own sensors may be blocked by traffics in the opposite direction. In such a situation, sensors of intelligent infrastructure system(s) 240 can provide useful, and sometimes vital, data to the left-turning vehicle. Such data may include, for example, traffic conditions, information of objects in the direction the vehicle is turning to, traffic light status and predictions, or the like. These sensor data generated by intelligent infrastructure system(s) 240 can be provided to vehicle perception and planning system 220 and/or vehicle onboard LiDAR system(s) 210, via communication paths 243 and/or 241, respectively. Communication paths 243 and/or 241 can include any wired or wireless communication links that can transfer data. For example, sensor data from intelligent infrastructure system(s) 240 may be transmitted to LiDAR system(s) 210 and correlated or fused with sensor data generated by LiDAR system(s) 210, thereby at least partially offloading the sensor fusion process performed by vehicle perception and planning system 220. V2V and V2I communications described above are examples of vehicle-to-X (V2X) communications, where the "X" represents any other devices, systems, sensors, infrastructure, or the like that can share data with a vehicle.

With reference still to FIG. 2, via various communication paths, vehicle perception and planning system 220 receives sensor data from one or more of LiDAR system(s) 210, other vehicle onboard sensor(s) 230, other vehicle(s) 250, and/or intelligent infrastructure system(s) 240. In some embodiments, different types of sensor data are correlated and/or integrated by a sensor fusion sub-system 222. For example, sensor fusion sub-system 222 can generate a 360-degree model using multiple images or videos captured by multiple cameras disposed at different positions of the vehicle. Sensor fusion sub-system 222 obtains sensor data from different types of sensors and uses the combined data to perceive the environment more accurately. For example, a vehicle onboard camera 232 may not capture a clear image because it is facing the sun or a light source (e.g., another vehicle's headlight during nighttime) directly. A LiDAR system 210 may not be affected as much and therefore sensor fusion sub-system 222 can combine sensor data provided by both camera 232 and LiDAR system 210, and use the sensor data provided by LiDAR system 210 to compensate the unclear image captured by camera 232. As another example, in a rainy or foggy weather, a radar sensor 234 may work better than a camera 232 or a LiDAR system 210. Accordingly, sensor fusion sub-system 222 may use sensor data provided by the radar sensor 234 to compensate the sensor data provided by camera 232 or LiDAR system 210.

In other examples, sensor data generated by other vehicle onboard sensor(s) 230 may have a lower resolution (e.g., radar sensor data) and thus may need to be correlated and confirmed by LiDAR system(s) 210, which usually has a higher resolution. For example, a sewage cover (also referred to as a manhole cover) may be detected by radar sensor 234 as an object towards which a vehicle is approaching. Due to the low-resolution nature of radar sensor 234, vehicle perception and planning system 220 may not be able to determine whether the object is an obstacle that the vehicle needs to avoid. High-resolution sensor data generated by LiDAR system(s) 210 thus can be used to correlated and confirm that the object is a sewage cover and causes no harm to the vehicle.

Vehicle perception and planning system 220 further comprises an object classifier 223. Using raw sensor data and/or correlated/fused data provided by sensor fusion sub-system 222, object classifier 223 can detect and classify the objects and estimate the positions of the objects. In some embodiments, object classifier 233 can use machine-learning based techniques to detect and classify objects. Examples of the machine-learning based techniques include utilizing algorithms such as region-based convolutional neural networks (R-CNN), Fast R-CNN, Faster R-CNN, histogram of oriented gradients (HOG), region-based fully convolutional network (R-FCN), single shot detector (SSD), spatial pyramid pooling (SPP-net), and/or You Only Look Once (Yolo).

Vehicle perception and planning system 220 further comprises a road detection sub-system 224. Road detection sub-system 224 localizes the road and identifies objects and/or markings on the road. For example, based on raw or fused sensor data provided by radar sensor(s) 234, camera(s) 232, and/or LiDAR system(s) 210, road detection sub-system 224 can build a 3D model of the road based on machine-learning techniques (e.g., pattern recognition algorithms for identifying lanes). Using the 3D model of the road, road detection sub-system 224 can identify objects (e.g., obstacles or debris on the road) and/or markings on the road (e.g., lane lines, turning marks, crosswalk marks, or the like).

Vehicle perception and planning system 220 further comprises a localization and vehicle posture sub-system 225. Based on raw or fused sensor data, localization and vehicle posture sub-system 225 can determine position of the vehicle and the vehicle's posture. For example, using sensor data from LiDAR system(s) 210, camera(s) 232, and/or GPS data, localization and vehicle posture sub-system 225 can determine an accurate position of the vehicle on the road and the vehicle's six degrees of freedom (e.g., whether the vehicle is moving forward or backward, up or down, and left or right). In some embodiments, high-definition (HD) maps are used for vehicle localization. HD maps can provide highly detailed, three-dimensional, computerized maps that pinpoint a vehicle's location. For instance, using the HD maps, localization and vehicle posture sub-system 225 can determine precisely the vehicle's current position (e.g., which lane of the road the vehicle is currently in, how close it is to a curb or a sidewalk) and predict vehicle's future positions.

Vehicle perception and planning system 220 further comprises obstacle predictor 226. Objects identified by object classifier 223 can be stationary (e.g., a light pole, a road sign) or dynamic (e.g., a moving pedestrian, bicycle, another car). For moving objects, predicting their moving path or future positions can be important to avoid collision. Obstacle predictor 226 can predict an obstacle trajectory and/or warn the driver or the vehicle planning sub-system 228 about a potential collision. For example, if there is a high likelihood that the obstacle's trajectory intersects with the vehicle's current moving path, obstacle predictor 226 can generate such a warning. Obstacle predictor 226 can use a variety of techniques for making such a prediction. Such techniques include, for example, constant velocity or acceleration models, constant turn rate and velocity/acceleration models, Kalman Filter and Extended Kalman Filter based models, recurrent neural network (RNN) based models, long short-term memory (LSTM) neural network based models, encoder-decoder RNN models, or the like.

With reference still to FIG. 2, in some embodiments, vehicle perception and planning system 220 further comprises vehicle planning sub-system 228. Vehicle planning sub-system 228 can include a route planner, a driving behaviors planner, and a motion planner. The route planner can plan the route of a vehicle based on the vehicle's current location data, target location data, traffic information, etc. The driving behavior planner adjusts the timing and planned movement based on how other objects might move, using the obstacle prediction results provided by obstacle predictor 226. The motion planner determines the specific operations the vehicle needs to follow. The planning results are then communicated to vehicle control system 280 via vehicle interface 270. The communication can be performed through communication paths 223 and 271, which include any wired or wireless communication links that can transfer data.

Vehicle control system 280 controls the vehicle's steering mechanism, throttle, brake, etc., to operate the vehicle according to the planned route and movement. Vehicle perception and planning system 220 may further comprise a user interface 260, which provides a user (e.g., a driver) access to vehicle control system 280 to, for example, override or take over control of the vehicle when necessary. User interface 260 can communicate with vehicle perception and planning system 220, for example, to obtain and display raw or fused sensor data, identified objects, vehicle's location/posture, etc. These displayed data can help a user to better operate the vehicle. User interface 260 can communicate with vehicle perception and planning system 220 and/or vehicle control system 280 via communication paths 221 and 261 respectively, which include any wired or wireless communication links that can transfer data. It is understood that the various systems, sensors, communication links, and interfaces in FIG. 2 can be configured in any desired manner and not limited to the configuration shown in FIG. 2.

Figure 3:
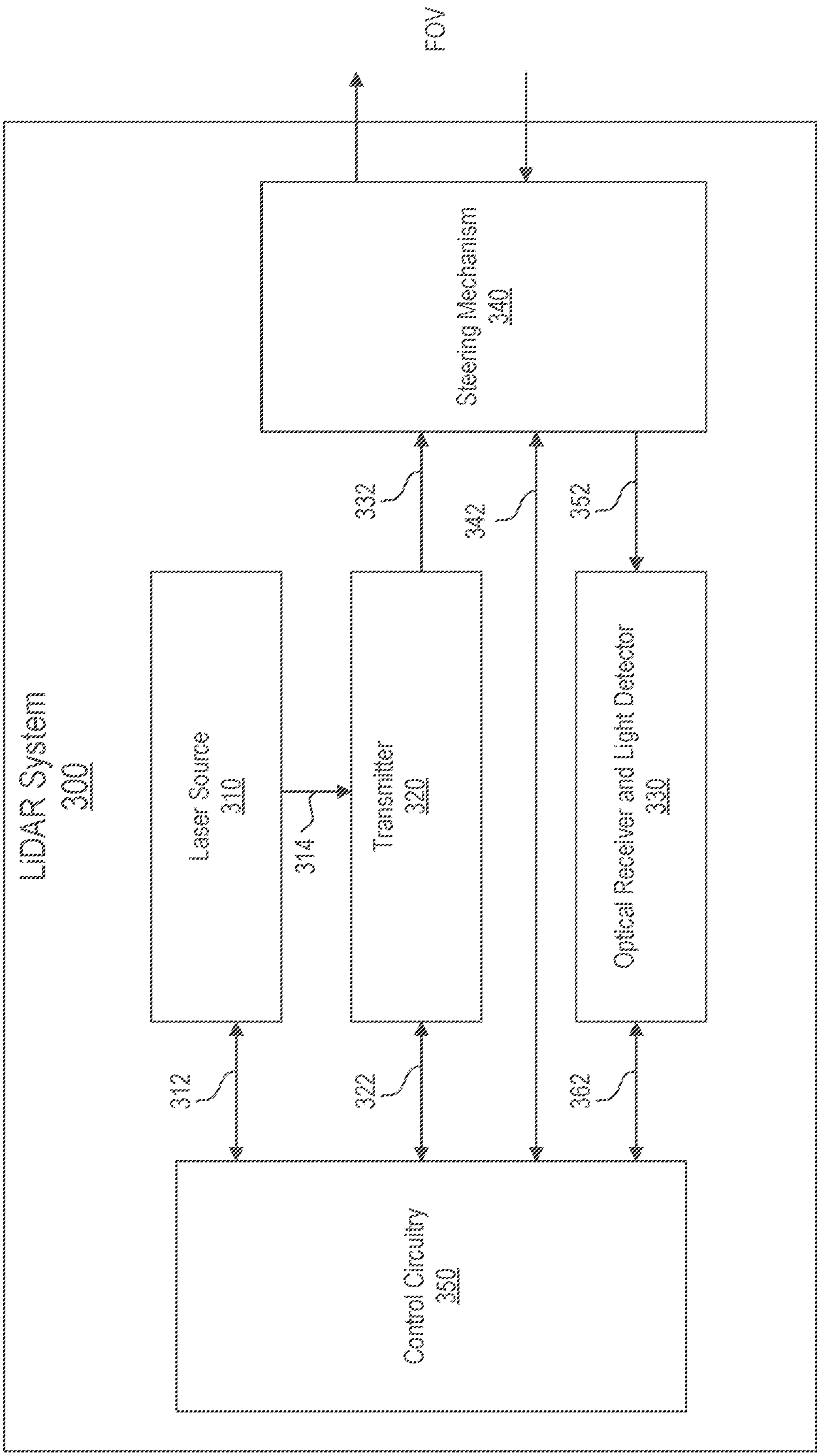
FIG. 3 is a block diagram illustrating an exemplary LiDAR system.

FIG. 3 is a block diagram illustrating an exemplary LiDAR system 300. LiDAR system 300 can be used to implement LiDAR system 110, 120A-F, and/or 210 shown in FIGS. 1 and 2. In one embodiment, LiDAR system 300 comprises a laser source 310, a transmitter 320, an optical receiver and light detector 330, a steering system 340, and a control circuitry 350. These components are coupled together using communications paths 312, 314, 322, 332, 343, 352, and 362. These communications paths include communication links (wired or wireless, bidirectional or unidirectional) among the various LiDAR system components, but need not be physical components themselves. While the communications paths can be implemented by one or more electrical wires, buses, or optical fibers, the communication paths can also be wireless channels or free-space optical paths so that no physical communication medium is present. For example, in one embodiment of LiDAR system 300, communication path 314 between laser source 310 and transmitter 320 may be implemented using one or more optical fibers. Communication paths 332 and 352 may represent optical paths implemented using free space optical components and/or optical fibers. And communication paths 312, 322, 342, and 362 may be implemented using one or more electrical wires that carry electrical signals. The communications paths can also include one or more of the above types of communication mediums (e.g., they can include an optical fiber and a free-space optical component, or include one or more optical fibers and one or more electrical wires).

LiDAR system 300 can also include other components not depicted in FIG. 3, such as power buses, power supplies, LED indicators, switches, etc. Additionally, other communication connections among components may be present, such as a direct connection between light source 310 and optical receiver and light detector 330 to provide a reference signal so that the time from when a light pulse is transmitted until a return light pulse is detected can be accurately measured.

Laser source 310 outputs laser light for illuminating objects in a field of view (FOV). Laser source 310 can be, for example, a semiconductor-based laser (e.g., a diode laser) and/or a fiber-based laser. A semiconductor-based laser can be, for example, an edge emitting laser (EEL), a vertical cavity surface emitting laser (VCSEL), or the like. A fiber-based laser is a laser in which the active gain medium is an optical fiber doped with rare-earth elements such as erbium, ytterbium, neodymium, dysprosium, praseodymium, thulium and/or holmium. In some embodiments, a fiber laser is based on double-clad fibers, in which the gain medium forms the core of the fiber surrounded by two layers of cladding. The double-clad fiber allows the core to be pumped with a high-power beam, thereby enabling the laser source to be a high power fiber laser source.

In some embodiments, laser source 310 comprises a master oscillator (also referred to as a seed laser) and power amplifier (MOPA). The power amplifier amplifies the output power of the seed laser. The power amplifier can be a fiber amplifier, a bulk amplifier, or a semiconductor optical amplifier. The seed laser can be a solid-state bulk laser or a tunable external-cavity diode laser. In some embodiments, laser source 310 can be an optically pumped microchip laser. Microchip lasers are alignment-free monolithic solid-state lasers where the laser crystal is directly contacted with the end mirrors of the laser resonator. A microchip laser is typically pumped with a laser diode (directly or using a fiber) to obtain the desired output power. A microchip laser can be based on neodymium-doped yttrium aluminum garnet ($Y_3Al_5O_{12}$) laser crystals (i.e., Nd:YAG), or neodymium-doped vanadate (i.e., $ND:YVO_4$) laser crystals.

Figure 4:
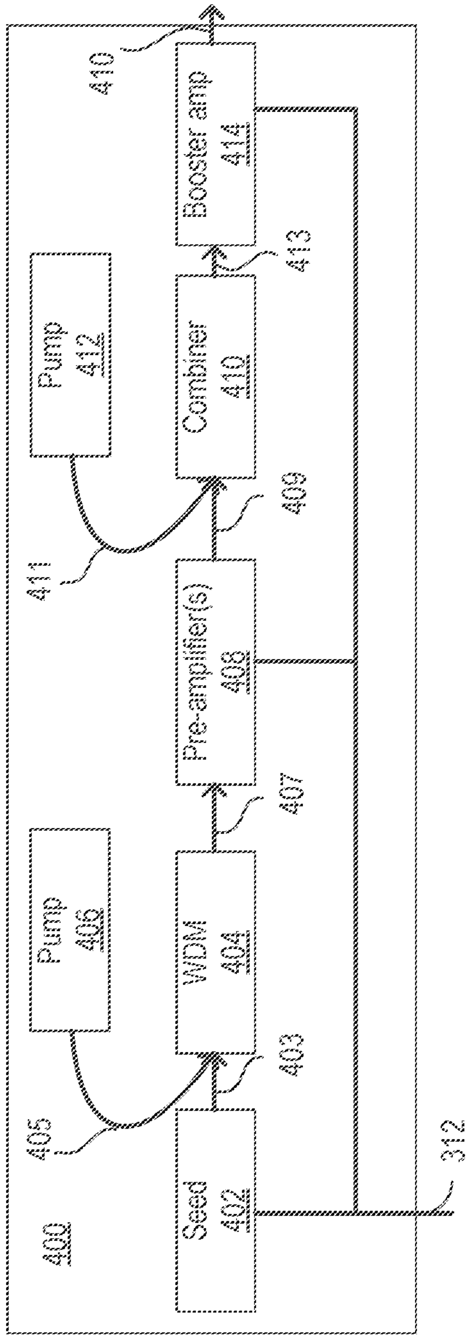
FIG. 4 is a block diagram illustrating an exemplary fiber-based laser source.

FIG. 4 is a block diagram illustrating an exemplary fiber-based laser source 400 having a seed laser and one or more pumps (e.g., laser diodes) for pumping desired output power. Fiber-based laser source 400 is an example of laser source 310 depicted in FIG. 3. In some embodiments, fiber-based laser source 400 comprises a seed laser 402 to generate initial light pulses of one or more wavelengths (e.g., 1550 nm), which are provided to a wavelength-division multiplexor (WDM) 404 via an optical fiber 403. Fiber-based laser source 400 further comprises a pump 406 for providing laser power (e.g., of a different wavelength, such as 980 nm) to WDM 404 via an optical fiber 405. WDM 404 multiplexes the light pulses provided by seed laser 402 and the laser power provided by pump 406 onto a single optical fiber 407. The output of WDM 404 can then be provided to one or more pre-amplifier(s) 408 via optical fiber 407. Pre- amplifier(s) 408 can be optical amplifier(s) that amplify optical signals (e.g., with about 20-30 dB gain). In some embodiments, pre-amplifier(s) 408 are low noise amplifiers. Pre-amplifier(s) 408 output to a combiner 410 via an optical fiber 409. Combiner 410 combines the output laser light of pre-amplifier(s) 408 with the laser power provided by pump 412 via an optical fiber 411. Combiner 410 can combine optical signals having the same wavelength or different wavelengths. One example of a combiner is a WDM. Combiner 410 provides pulses to a booster amplifier 414 via an optical fiber 413, which produces output light pulses via optical fiber 410. The booster amplifier 414 provides further amplification of the optical signals. The outputted light pulses can then be transmitted to transmitter 320 and/or steering mechanism 340 (shown in FIG. 3). It is understood that FIG. 4 illustrates one exemplary configuration of fiber-based laser source 400. Laser source 400 can have many other configurations using different combinations of one or more components shown in FIG. 4 and/or other components not shown in FIG. 4 (e.g., other components such as power supplies, lens, filters, splitters, combiners, etc.).

In some variations, fiber-based laser source 400 can be controlled (e.g., by control circuitry 350) to produce pulses of different amplitudes based on the fiber gain profile of the fiber used in fiber-based laser source 400. Communication path 312 couples fiber-based laser source 400 to control circuitry 350 (shown in FIG. 3) so that components of fiber-based laser source 400 can be controlled by or otherwise communicate with control circuitry 350. Alternatively, fiber-based laser source 400 may include its own dedicated controller. Instead of control circuitry 350 communicating directly with components of fiber-based laser source 400, a dedicated controller of fiber-based laser source 400 communicates with control circuitry 350 and controls and/or communicates with the components of fiber-based light source 400. Fiber-based light source 400 can also include other components not shown, such as one or more power connectors, power supplies, and/or power lines.

Referencing FIG. 3, typical operating wavelengths of laser source 310 comprise, for example, about 850 nm, about 905 nm, about 940 nm, about 1064 nm, and about 1550 nm. The upper limit of maximum usable laser power is set by the U.S. FDA (U.S. Food and Drug Administration) regulations. The optical power limit at 1550 nm wavelength is much higher than those of the other aforementioned wavelengths. Further, at 1550 nm, the optical power loss in a fiber is low. There characteristics of the 1550 nm wavelength make it more beneficial for long-range LiDAR applications. The amount of optical power output from laser source 310 can be characterized by its peak power, average power, and the pulse energy. The peak power is the ratio of pulse energy to the width of the pulse (e.g., full width at half maximum or FWHM). Thus, a smaller pulse width can provide a larger peak power for a fixed amount of pulse energy. A pulse width can be in the range of nanosecond or picosecond. The average power is the product of the energy of the pulse and the pulse repetition rate (PRR). As described in more detail below, the PRR represents the frequency of the pulsed laser light. The PRR typically corresponds to the maximum range that a LiDAR system can measure. Laser source 310 can be configured to produce pulses at high PRR to meet the desired number of data points in a point cloud generated by the LiDAR system. Laser source 310 can also be configured to produce pulses at medium or low PRR to meet the desired maximum detection distance. Wall plug efficiency (WPE) is another factor to evaluate the total power consumption, which may be a key indicator in evaluating the laser efficiency. For example, as shown in FIG. 1, multiple LiDAR systems may be attached to a vehicle, which may be an electrical-powered vehicle or a vehicle otherwise having limited fuel or battery power supply. Therefore, high WPE and intelligent ways to use laser power are often among the important considerations when selecting and configuring laser source 310 and/or designing laser delivery systems for vehicle-mounted LiDAR applications.

It is understood that the above descriptions provide non-limiting examples of a laser source 310. Laser source 310 can be configured to include many other types of light sources (e.g., laser diodes, short-cavity fiber lasers, solid-state lasers, and/or tunable external cavity diode lasers) that are configured to generate one or more light signals at various wavelengths. In some examples, light source 310 comprises amplifiers (e.g., pre-amplifiers and/or booster amplifiers), which can be a doped optical fiber amplifier, a solid-state bulk amplifier, and/or a semiconductor optical amplifier. The amplifiers are configured to receive and amplify light signals with desired gains.

With reference back to FIG. 3, LiDAR system 300 further comprises a transmitter 320. Laser source 310 provides laser light (e.g., in the form of a laser beam) to transmitter 320. The laser light provided by laser source 310 can be amplified laser light with a predetermined or controlled wavelength, pulse repetition rate, and/or power level. Transmitter 320 receives the laser light from laser source 310 and transmits the laser light to steering mechanism 340 with low divergence. In some embodiments, transmitter 320 can include, for example, optical components (e.g., lens, fibers, mirrors, etc.) for transmitting laser beams to a field-of-view (FOV) directly or via steering mechanism 340. While FIG. 3 illustrates transmitter 320 and steering mechanism 340 as separate components, they may be combined or integrated as one system in some embodiments. Steering mechanism 340 is described in more detail below.

Laser beams provided by laser source 310 may diverge as they travel to transmitter 320. Therefore, transmitter 320 often comprises a collimating lens configured to collect the diverging laser beams and produce parallel optical beams with reduced or minimum divergence. The parallel optical beams can then be further directed through various optics such as mirrors and lens. A collimating lens may be, for example, a plano-convex lens. The collimating lens can be configured to have any desired properties such as the beam diameter, divergence, numerical aperture, focal length, or the like. A beam propagation ratio or beam quality factor (also referred to as the $M^2$ factor) is used for measurement of laser beam quality. In many LiDAR applications, it is important to control good laser beam quality in generated a transmitting laser beam. The $M^2$ factor represents a degree of variation of a beam from an ideal Gaussian beam. Thus, the $M^2$ factor reflects how well a collimated laser beam can be focused on a small spot, or how well a divergent laser beam can be collimated. The smaller the $M^2$ factor, the tighter the focus of the laser beam and the more intense a beam spot can be obtained. Therefore, laser source 310 and/or transmitter 320 can be configured to obtained desired $M^2$ factor according to, for example, a scan resolution requirement.

One or more of the light beams provided by transmitter 320 are scanned by steering mechanism 340 to a FOV. Steering mechanism 340 scans light beams in multiple dimensions (e.g., in both the horizontal and vertical dimension) to facilitate LiDAR system 300 to map the environment by generating a 3D point cloud. Steering mechanism 340 will be described in more detail below. The laser light scanned to an FOV may be scattered or reflected by an object in the FOV. At least a portion of the scattered or reflected light returns to LiDAR system 300. FIG. 3 further illustrates an optical receiver and light detector 330 configured to receive the return light. Optical receiver and light detector 330 comprises an optical receiver that is configured to collect the return light from the FOV. The optical receiver can include optics (e.g., lens, fibers, mirrors, etc.) for receiving, redirecting, focus, amplifying, and/or filtering return light from the FOV. For example, the optical receiver often includes a receiver lens or focusing lens (e.g., a plano-convex lens) to collect and/or focus the collected return light onto a light detector.

A light detector detects the return light focused by the optical receiver and generates current and/or voltage signals proportional to the incident intensity of the return light. Based on such current and/or voltage signals, the depth information of the object in the FOV can be derived. One exemplary method for deriving such depth information is based on the direct TOF (time of flight), which is described in more detail below. A light detector may be characterized by its detection sensitivity, quantum efficiency, detector bandwidth, linearity, signal to noise ratio (SNR), overload resistance, interference immunity, etc. Based on the applications, the light detector can be configured or customized to have any desired characteristics. For example, optical receiver and light detector 330 can be configured such that the light detector has a large dynamic range while having a good linearity. The light detector linearity indicates the detector's capability of maintaining linear relationship between input optical signal power and the detector's output. A detector having good linearity can maintain a linear relationship over a large dynamic input optical signal range.

To achieve desired detector characteristics, configurations or customizations can be made to the light detector's structure and/or the detector's material system. Various detector structure can be used for a light detector. For example, a light detector structure can be a PIN based structure, which has a undoped intrinsic semiconductor region (i.e., an "i" region) between a p-type semiconductor and an n-type semiconductor region. Other light detector structures comprise, for example, a APD (avalanche photodiode) based structure, a PMT (photomultiplier tube) based structure, a SiPM (Silicon photomultiplier) based structure, a SPAD (single-photon avalanche diode) base structure, and/or quantum wires. For material systems used in a light detector, Si, InGaAs, and/or Si/Ge based materials can be used. It is understood that many other detector structures and/or material systems can be used in optical receiver and light detector 330.

A light detector (e.g., an APD based detector) may have an internal gain such that the input signal is amplified when generating an output signal. However, noise may also be amplified due to the light detector's internal gain. Common types of noise include signal shot noise, dark current shot noise, thermal noise, and amplifier noise (TIA). In some embodiments, optical receiver and light detector 330 may include a pre-amplifier that is a low noise amplifier (LNA). In some embodiments, the pre-amplifier may also include a TIA-transimpedance amplifier, which converts a current signal to a voltage signal. For a linear detector system, input equivalent noise or noise equivalent power (NEP) measures how sensitive the light detector is to weak signals. Therefore, they can be used as indicators of the overall system performance. For example, the NEP of a light detector specifies the power of the weakest signal that can be detected and therefore it in turn specifies the maximum range of a LiDAR system. It is understood that various light detector optimization techniques can be used to meet the requirement of LiDAR system 300. Such optimization techniques may include selecting different detector structures, materials, and/or implement signal processing techniques (e.g., filtering, noise reduction, amplification, or the like). For example, in addition to or instead of using direct detection of return signals (e.g., by using TOF), coherent detection can also be used for a light detector. Coherent detection allows for detecting amplitude and phase information of the received light by interfering the received light with a local oscillator. Coherent detection can improve detection sensitivity and noise immunity.

FIG. 3 further illustrates that LiDAR system 300 comprises steering mechanism 340. As described above, steering mechanism 340 directs light beams from transmitter 320 to scan an FOV in multiple dimensions. A steering mechanism is referred to as a raster mechanism or a scanning mechanism. Scanning light beams in multiple directions (e.g., in both the horizontal and vertical directions) facilitates a LiDAR system to map the environment by generating an image or a 3D point cloud. A steering mechanism can be based on mechanical scanning and/or solid-state scanning. Mechanical scanning uses rotating mirrors to steer the laser beam or physically rotate the LiDAR transmitter and receiver (collectively referred to as transceiver) to scan the laser beam. Solid-state scanning directs the laser beam to various positions through the FOV without mechanically moving any macroscopic components such as the transceiver. Solid-state scanning mechanisms include MEMS mirror based steering, optical phased arrays based steering, and flash LiDAR based steering. In some embodiments, because solid-state scanning mechanisms do not physically move macroscopic components, the steering performed by a solid-state scanning mechanism may be referred to as effective steering. A LiDAR system using solid-state scanning may also be referred to as a non-mechanical scanning or simply non-scanning LiDAR system (a flash LiDAR system is an exemplary non-scanning LiDAR system).

Steering mechanism 340 can be used with the transceiver (e.g., transmitter 320 and optical receiver and light detector 330) to scan the FOV for generating an image or a 3D point cloud. As an example, to implement steering mechanism 340, a two-dimensional mechanical scanner can be used with a single-point or several single-point transceivers. A single-point transceiver transmits a single light beam or a small number of light beams (e.g., 2-8 beams) to the steering mechanism. A two-dimensional mechanical steering mechanism comprises, for example, polygon mirror(s), oscillating mirror(s), rotating prism(s), rotating tilt mirror surface(s), or a combination thereof. In some embodiments, steering mechanism 340 may include non-mechanical steering mechanism(s) such as solid-state steering mechanism(s). For example, steering mechanism 340 can be based on tuning wavelength of the laser light combined with refraction effect, and/or based on reconfigurable grating/phase array. In some embodiments, steering mechanism 340 can use a single scanning device to achieve two-dimensional scanning or two devices combined to realize two-dimensional scanning.

As another example, to implement steering mechanism 340, a one-dimensional mechanical scanner can be used with an array or a large number of single-point transceivers. Specifically, the transceiver array can be mounted on a rotating platform to achieve 360-degree horizontal field of view. Alternatively, a static transceiver array can be combined with the one-dimensional mechanical scanner. A one-dimensional mechanical scanner comprises polygon mirror (s), oscillating mirror(s), rotating prism(s), rotating tilt mirror surface(s) for obtaining a forward-looking horizontal field of view. Steering mechanisms using mechanical scanners can provide robustness and reliability in high volume production for automotive applications.

As another example, to implement steering mechanism 340, a two-dimensional transceiver can be used to generate a scan image or a 3D point cloud directly. In some embodiments, a stitching or micro shift method can be used to improve the resolution of the scan image or the field of view being scanned. For example, using a two-dimensional transceiver, signals generated at one direction (e.g., the horizontal direction) and signals generated at the other direction (e.g., the vertical direction) may be integrated, interleaved, and/or matched to generate a higher or full resolution image or 3D point cloud representing the scanned FOV.

Some implementations of steering mechanism 340 comprise one or more optical redirection elements (e.g., mirrors or lens) that steer return light signals (e.g., by rotating, vibrating, or directing) along a receive path to direct the return light signals to optical receiver and light detector 330. The optical redirection elements that direct light signals along the transmitting and receiving paths may be the same components (e.g., shared), separate components (e.g., dedicated), and/or a combination of shared and separate components. This means that in some cases the transmitting and receiving paths are different although they may partially overlap (or in some cases, substantially overlap).

With reference still to FIG. 3, LiDAR system 300 further comprises control circuitry 350. Control circuitry 350 can be configured and/or programmed to control various parts of the LiDAR system 300 and/or to perform signal processing. In a typical system, control circuitry 350 can be configured and/or programmed to perform one or more control operations including, for example, controlling laser source 310 to obtain desired laser pulse timing, repetition rate, and power; controlling steering mechanism 340 (e.g., controlling the speed, direction, and/or other parameters) to scan the FOV and maintain pixel registration/alignment; controlling optical receiver and light detector 330 (e.g., controlling the sensitivity, noise reduction, filtering, and/or other parameters) such that it is an optimal state; and monitoring overall system health/status for functional safety.

Control circuitry 350 can also be configured and/or programmed to perform signal processing to the raw data generated by optical receiver and light detector 330 to derive distance and reflectance information, and perform data packaging and communication to vehicle perception and planning system 220 (shown in FIG. 2). For example, control circuitry 350 determines the time it takes from transmitting a light pulse until a corresponding return light pulse is received; determines when a return light pulse is not received for a transmitted light pulse; determines the direction (e.g., horizontal and/or vertical information) for a transmitted/return light pulse; determines the estimated range in a particular direction; and/or determines any other type of data relevant to LiDAR system 300.

LiDAR system 300 can be disposed in a vehicle, which may operate in many different environments including hot or cold weather, rough road conditions that may cause intense vibration, high or low humidifies, dusty areas, etc. Therefore, in some embodiments, optical and/or electronic components of LiDAR system 300 (e.g., optics in transmitter 320, optical receiver and light detector 330, and steering mechanism 340) are disposed or configured in such a manner to maintain long term mechanical and optical stability. For example, components in LiDAR system 300 may be secured and sealed such that they can operate under all conditions a vehicle may encounter. As an example, an anti-moisture coating and/or hermetic sealing may be applied to optical components of transmitter 320, optical receiver and light detector 330, and steering mechanism 340 (and other components that are susceptible to moisture). As another example, housing(s), enclosure(s), and/or window can be used in LiDAR system 300 for providing desired characteristics such as hardness, ingress protection (IP) rating, self-cleaning capability, resistance to chemical and resistance to impact, or the like. In addition, efficient and economical methodologies for assembling LiDAR system 300 may be used to meet the LiDAR operating requirements while keeping the cost low.

It is understood by a person of ordinary skill in the art that FIG. 3 and the above descriptions are for illustrative purposes only, and a LiDAR system can include other functional units, blocks, or segments, and can include variations or combinations of these above functional units, blocks, or segments. For example, LiDAR system 300 can also include other components not depicted in FIG. 3, such as power buses, power supplies, LED indicators, switches, etc. Additionally, other connections among components may be present, such as a direct connection between light source 310 and optical receiver and light detector 330 so that light detector 330 can accurately measure the time from when light source 310 transmits a light pulse until light detector 330 detects a return light pulse.

These components shown in FIG. 3 are coupled together using communications paths 312, 314, 322, 332, 342, 352, and 362. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 314 includes one or more optical fibers; communication path 352 represents an optical path; and communication paths 312, 322, 342, and 362 are all electrical wires that carry electrical signals. The communication paths can also include more than one of the above types of communication mediums (e.g., they can include an optical fiber and an optical path, or one or more optical fibers and one or more electrical wires).

Figure 5A:
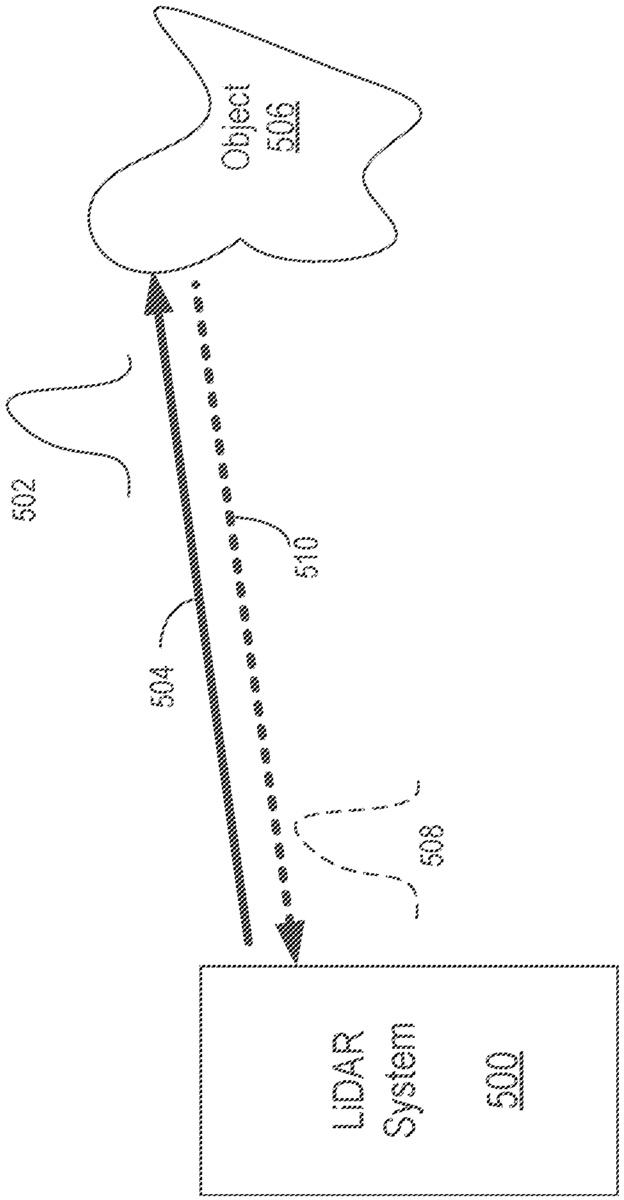
FIGS. 5A-5C illustrate an exemplary LiDAR system using pulse signals to measure distances to objects disposed in a field-of-view (FOV).

As described above, some LiDAR systems use the time-of-flight (TOF) of light signals (e.g., light pulses) to determine the distance to objects in a light path. For example, with reference to FIG. 5A, an exemplary LiDAR system 500 includes a laser light source (e.g., a fiber laser), a steering system (e.g., a system of one or more moving mirrors), and a light detector (e.g., a photon detector with one or more optics). LiDAR system 500 can be implemented using, for example, LiDAR system 300 described above. LiDAR system 500 transmits a light pulse 502 along light path 504 as determined by the steering system of LiDAR system 500. In the depicted example, light pulse 502, which is generated by the laser light source, is a short pulse of laser light. Further, the signal steering system of the LiDAR system 500 is a pulsed-signal steering system. However, it should be appreciated that LiDAR systems can operate by generating, transmitting, and detecting light signals that are not pulsed and derive ranges to an object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulsed signals also may be applicable to LiDAR systems that do not use one or both of these techniques.

Referring back to FIG. 5A (e.g., illustrating a time-of-flight LiDAR system that uses light pulses), when light pulse 502 reaches object 506, light pulse 502 scatters or reflects to generate a return light pulse 508. Return light pulse 508 may return to system 500 along light path 510. The time from when transmitted light pulse 502 leaves LiDAR system 500 to when return light pulse 508 arrives back at LiDAR system 500 can be measured (e.g., by a processor or other electronics, such as control circuitry 350, within the LiDAR system). This time-of-flight combined with the knowledge of the speed of light can be used to determine the range/distance from LiDAR system 500 to the portion of object 506 where light pulse 502 scattered or reflected.

Figure 5B:
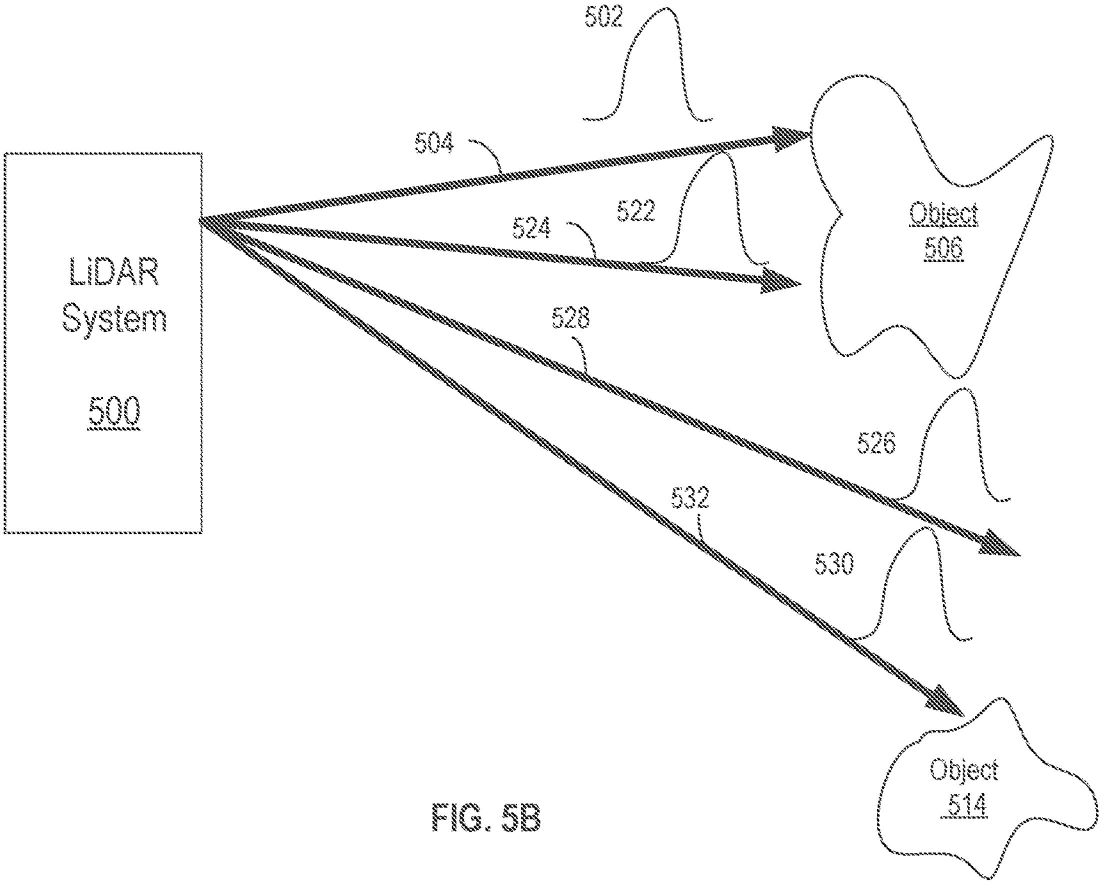
Figure 5C:
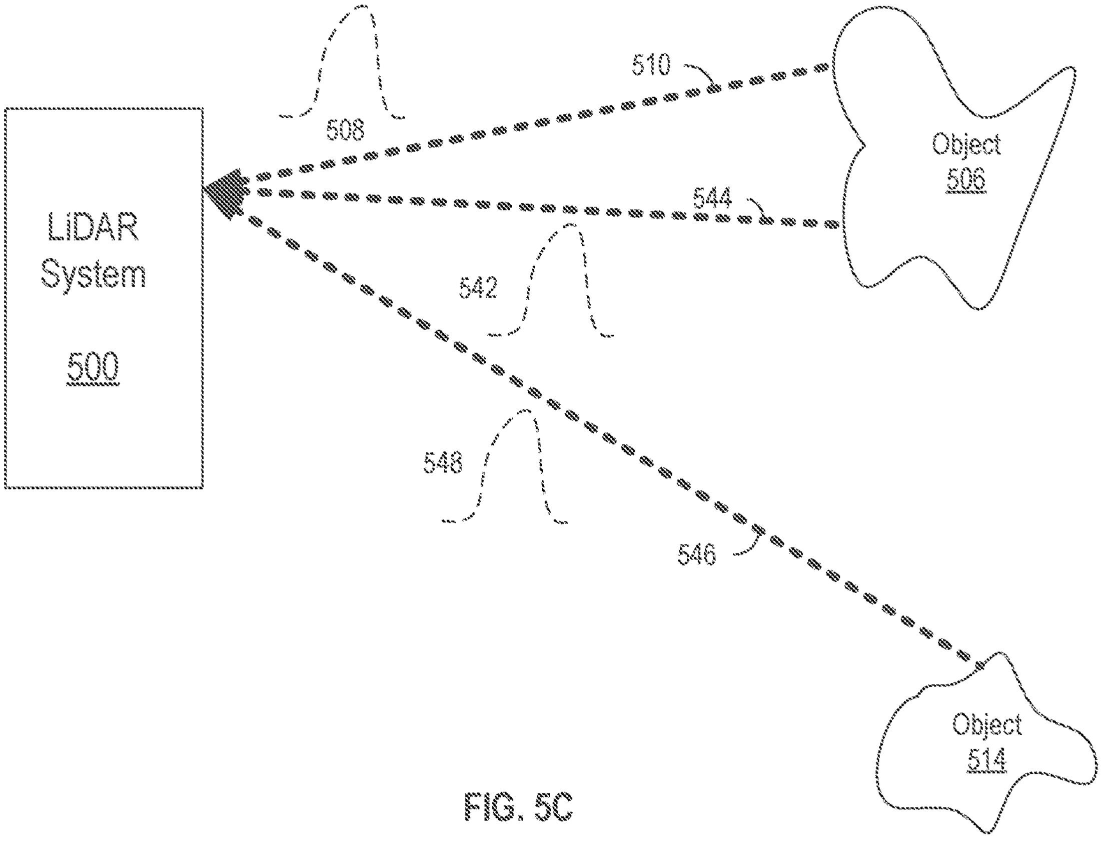

By directing many light pulses, as depicted in FIG. 5B, LiDAR system 500 scans the external environment (e.g., by directing light pulses 502, 522, 526, 530 along light paths 504, 524, 528, 532, respectively). As depicted in FIG. 5C, LiDAR system 500 receives return light pulses 508, 542, 548 (which correspond to transmitted light pulses 502, 522, 530, respectively). Return light pulses 508, 542, and 548 are generated by scattering or reflecting the transmitted light pulses by one of objects 506 and 514. Return light pulses 508, 542, and 548 may return to LiDAR system 500 along light paths 510, 544, and 546, respectively. Based on the direction of the transmitted light pulses (as determined by LiDAR system 500) as well as the calculated range from LiDAR system 500 to the portion of objects that scatter or reflect the light pulses (e.g., the portions of objects 506 and 514), the external environment within the detectable range (e.g., the field of view between path 504 and 532, inclusively) can be precisely mapped or plotted (e.g., by generating a 3D point cloud or images).

If a corresponding light pulse is not received for a particular transmitted light pulse, then it may be determined that there are no objects within a detectable range of LiDAR system 500 (e.g., an object is beyond the maximum scanning distance of LiDAR system 500). For example, in FIG. 5B, light pulse 526 may not have a corresponding return light pulse (as illustrated in FIG. 5C) because light pulse 526 may not produce a scattering event along its transmission path 528 within the predetermined detection range. LiDAR system 500, or an external system in communication with LiDAR system 500 (e.g., a cloud system or service), can interpret the lack of return light pulse as no object being disposed along light path 528 within the detectable range of LiDAR system 500.

In FIG. 5B, light pulses 502, 522, 526, and 530 can be transmitted in any order, serially, in parallel, or based on other timings with respect to each other. Additionally, while FIG. 5B depicts transmitted light pulses as being directed in one dimension or one plane (e.g., the plane of the paper), LiDAR system 500 can also direct transmitted light pulses along other dimension(s) or plane(s). For example, LiDAR system 500 can also direct transmitted light pulses in a dimension or plane that is perpendicular to the dimension or plane shown in FIG. 5B, thereby forming a 2-dimensional transmission of the light pulses. This 2-dimensional transmission of the light pulses can be point-by-point, line-by-line, all at once, or in some other manner. A point cloud or image from a 1-dimensional transmission of light pulses (e.g., a single horizontal line) can generate 2-dimensional data (e.g., (1) data from the horizontal transmission direction and (2) the range or distance to objects). Similarly, a point cloud or image from a 2-dimensional transmission of light pulses can generate 3-dimensional data (e.g., (1) data from the horizontal transmission direction, (2) data from the vertical transmission direction, and (3) the range or distance to objects). In general, a LiDAR system performing an n-dimensional transmission of light pulses generates (n+1) dimensional data. This is because the LiDAR system can measure the depth of an object or the range/distance to the object, which provides the extra dimension of data. Therefore, a 2D scanning by a LiDAR system can generate a 3D point cloud for mapping the external environment of the LiDAR system.

The density of a point cloud refers to the number of measurements (data points) per area performed by the LiDAR system. A point cloud density relates to the LiDAR scanning resolution. Typically, a larger point cloud density, and therefore a higher resolution, is desired at least for the region of interest (ROI). The density of points in a point cloud or image generated by a LiDAR system is equal to the number of pulses divided by the field of view. In some embodiments, the field of view can be fixed. Therefore, to increase the density of points generated by one set of transmission-receiving optics (or transceiver optics), the LiDAR system may need to generate a pulse more frequently. In other words, a light source with a higher pulse repetition rate (PRR) is needed. On the other hand, by generating and transmitting pulses more frequently, the farthest distance that the LiDAR system can detect may be limited. For example, if a return signal from a distant object is received after the system transmits the next pulse, the return signals may be detected in a different order than the order in which the corresponding signals are transmitted, thereby causing ambiguity if the system cannot correctly correlate the return signals with the transmitted signals.

To illustrate, consider an exemplary LiDAR system that can transmit laser pulses with a repetition rate between 500 kHz and 1 MHz. Based on the time it takes for a pulse to return to the LiDAR system and to avoid mix-up of return pulses from consecutive pulses in a conventional LiDAR design, the farthest distance the LiDAR system can detect may be 300 meters and 150 meters for 500 kHz and 1 MHz, respectively. The density of points of a LiDAR system with 500 kHz repetition rate is half of that with 1 MHz. Thus, this example demonstrates that, if the system cannot correctly correlate return signals that arrive out of order, increasing the repetition rate from 500 kHz to 1 MHz (and thus improving the density of points of the system) may reduce the detection range of the system. Various techniques are used to mitigate the tradeoff between higher PRR and limited detection range. For example, multiple wavelengths can be used for detecting objects in different ranges. Optical and/or signal processing techniques are also used to correlate between transmitted and return light signals.

Various systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Various systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers. Examples of client computers can include desktop computers, workstations, portable computers, cellular smartphones, tablets, or other types of computing devices.

Figure 12:
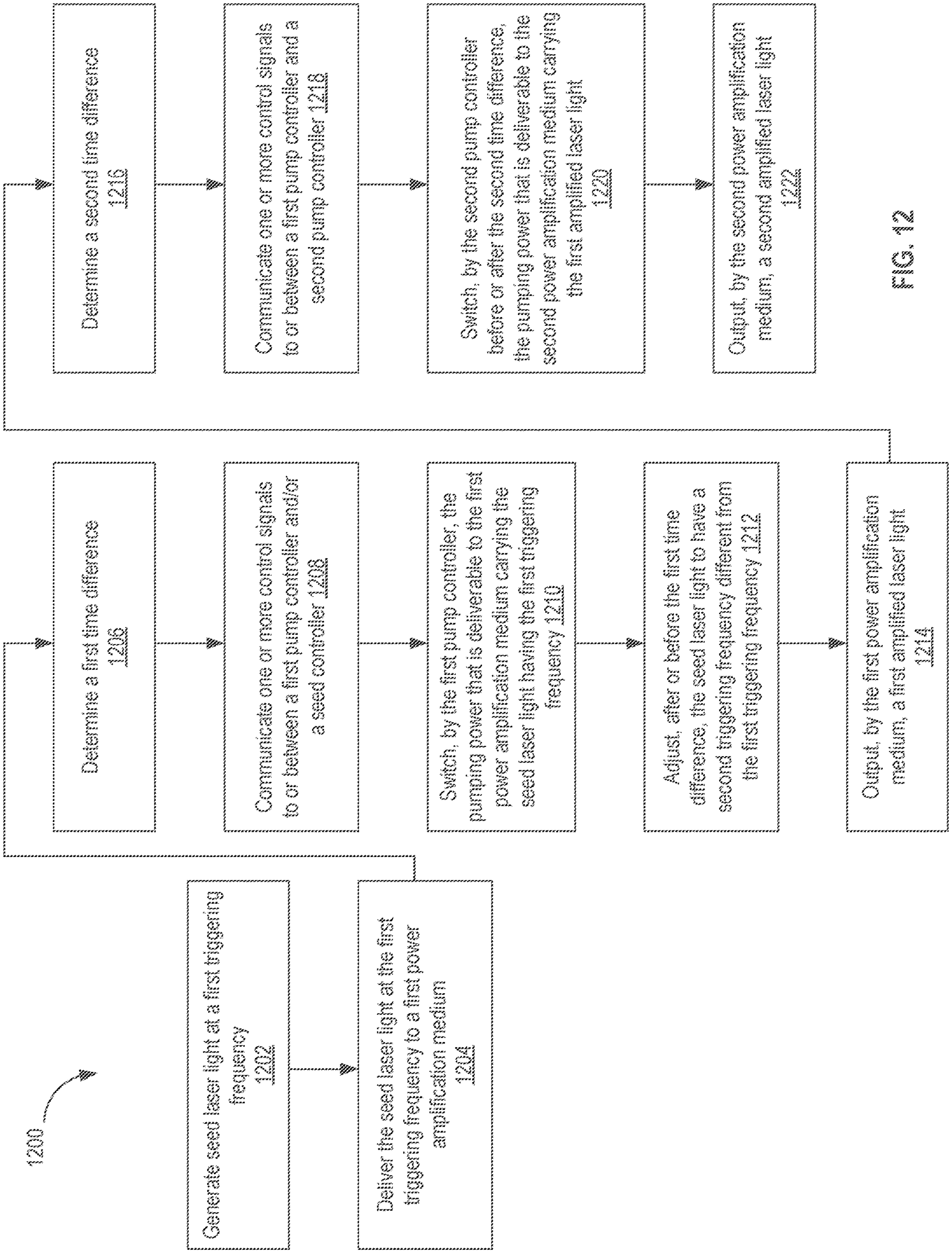
FIG. 12 is a flowchart illustrating a method for performing dynamic pulse control of a fiber laser, according to some embodiments.

Various systems, apparatus, and methods described herein may be implemented using a computer program product tangibly embodied in an information carrier, e.g., in a non-transitory machine-readable storage device, for execution by a programmable processor; and the method processes and steps described herein, including one or more of the steps of FIG. 12, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
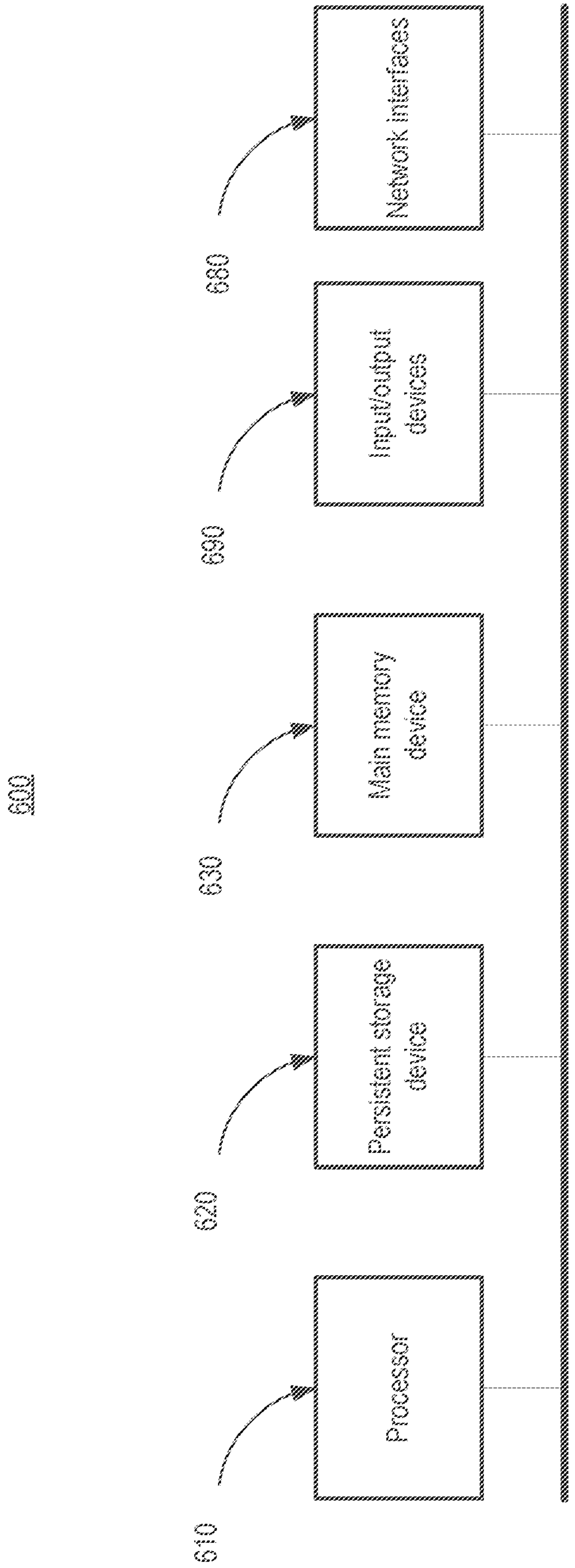
FIG. 6 is a block diagram illustrating an exemplary apparatus used to implement systems, apparatus, and methods in various embodiments.

A high-level block diagram of an exemplary apparatus that may be used to implement systems, apparatus and methods described herein is illustrated in FIG. 6. Apparatus 600 comprises a processor 610 operatively coupled to a persistent storage device 620 and a main memory device 630. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, processor 610 may be used to implement one or more components and systems described herein, such as control circuitry 350 (shown in FIG. 3), vehicle perception and planning system 220 (shown in FIG. 2), and vehicle control system 280 (shown in FIG. 2). Thus, one or more of the method steps of FIG. 12 can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by one or more of the method steps of FIG. 12. Accordingly, by executing the computer program instructions, the processor 610 executes an algorithm defined by the methods of FIGS. 3-5 and 12. Apparatus 600 also includes one or more network interfaces 680 for communicating with other devices via a network. Apparatus 600 may also include one or more input/output devices 690 that enable user interaction with apparatus 600 (e.g., display, keyboard, mouse, speakers, buttons, etc.).

Processor 610 may include both general and special purpose microprocessors and may be the sole processor or one of multiple processors of apparatus 600. Processor 610 may comprise one or more central processing units (CPUs), and one or more graphics processing units (GPUs), which, for example, may work separately from and/or multi-task with one or more CPUs to accelerate processing, e.g., for various image processing applications described herein. Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 690 may include peripherals, such as a printer, scanner, display screen, etc. For example, input/output devices 690 may include a display device such as a cathode ray tube (CRT), plasma or liquid crystal display (LCD) monitor for displaying information to a user, a keyboard, and a pointing device such as a mouse or a trackball by which the user can provide input to apparatus 600.

Any or all of the functions of the systems and apparatuses discussed herein may be performed by processor 610, and/or incorporated in, an apparatus or a system such as LiDAR system 300. Further, LiDAR system 300 and/or apparatus 600 may utilize one or more neural networks or other deep-learning techniques performed by processor 610 or other systems or apparatuses discussed herein.

One skilled in the art will recognize that an implementation of an actual computer or computer system may have other structures and may contain other components as well, and that FIG. 6 is a high-level representation of some of the components of such a computer for illustrative purposes.

Figure 7A:
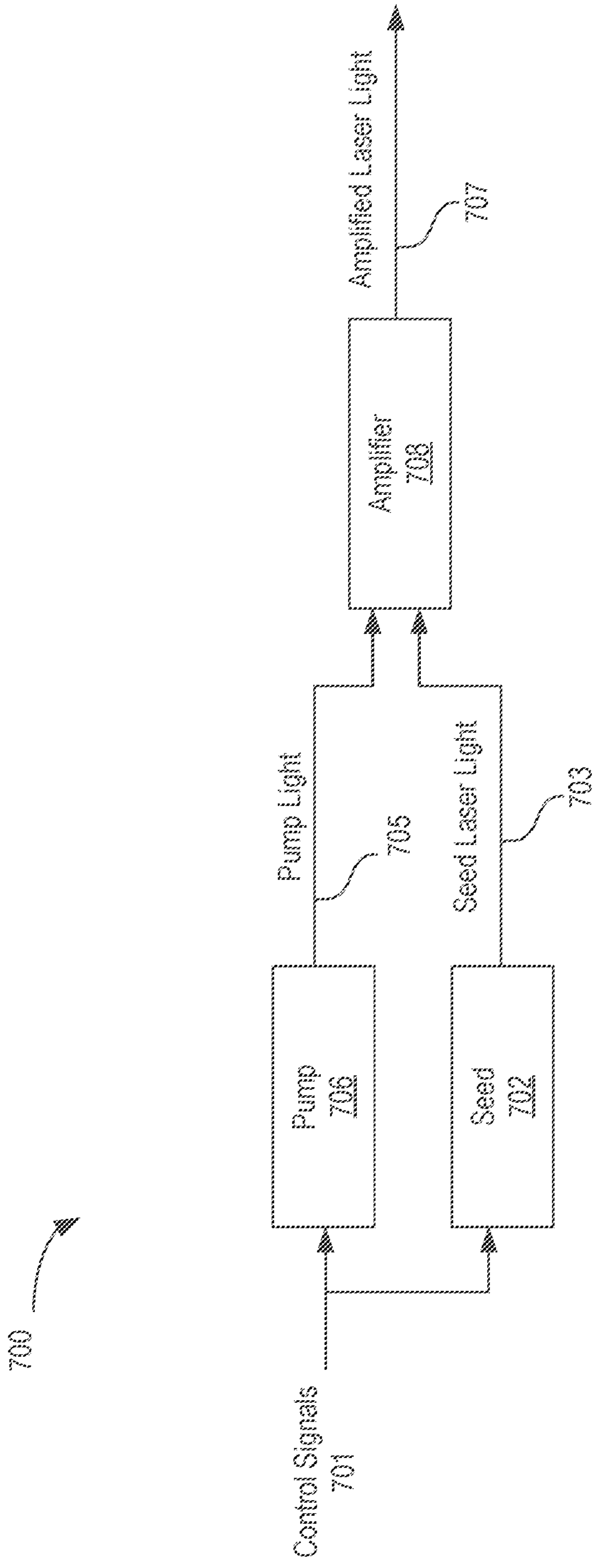
FIG. 7A Prior Art
FIGS. 7A-7C illustrate a conventional laser source and its signal waveforms when the laser source is controlled to change its triggering frequency.
Figure 7B:
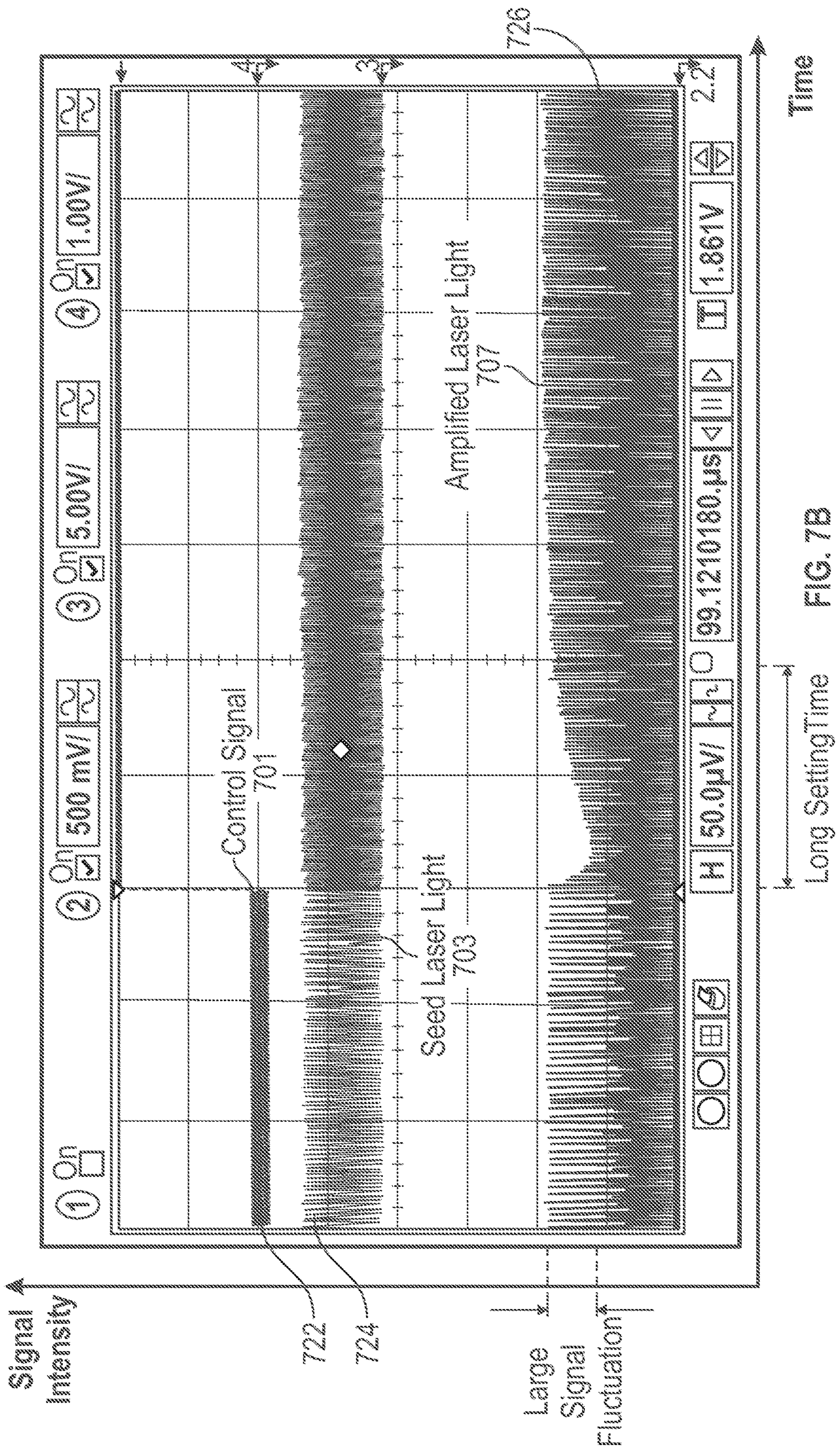
Figure 7C:
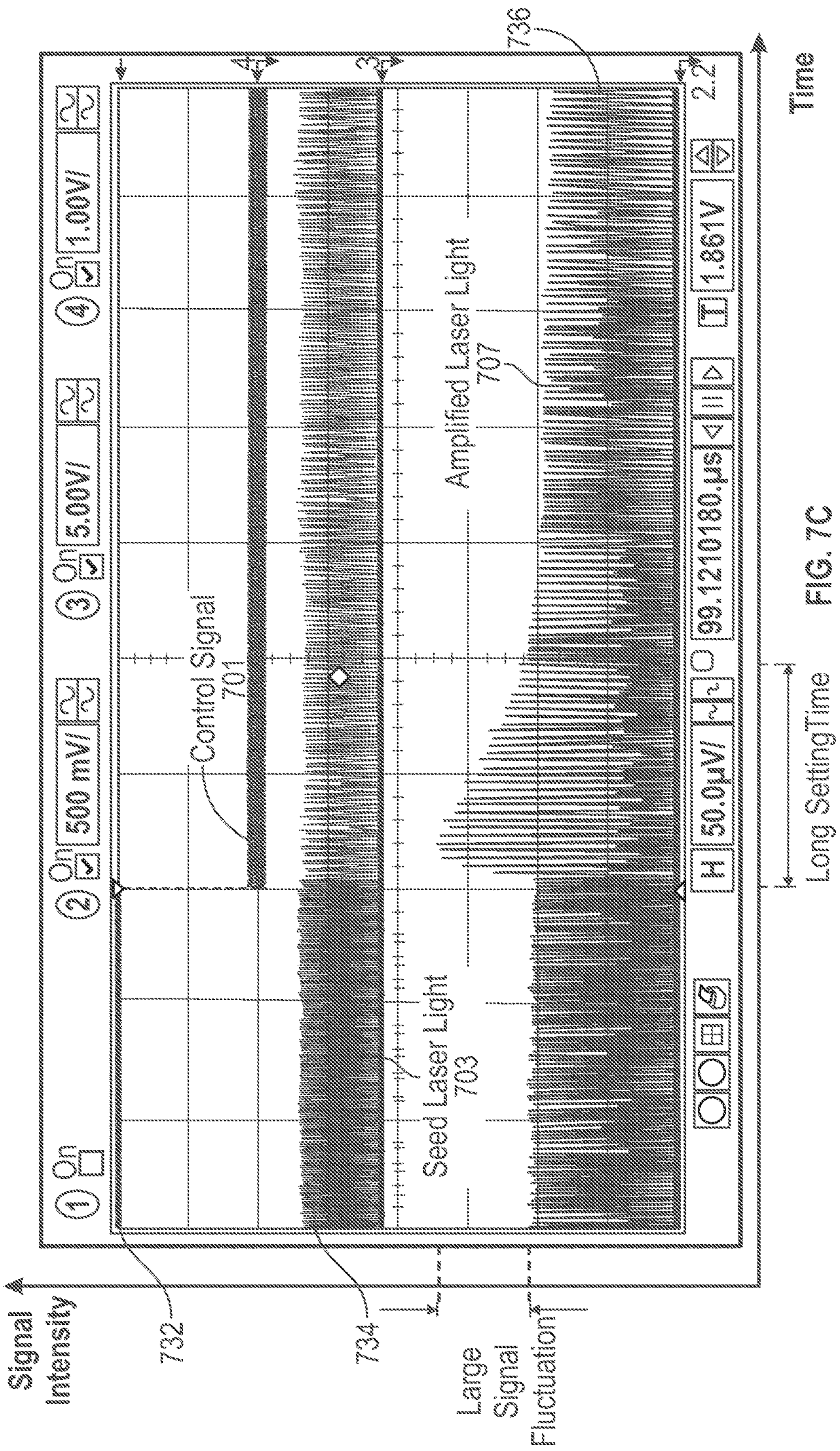

FIGS. 7A-7C illustrate a conventional laser source 700 and its signal waveforms when the laser source is controlled to change its triggering frequency. As shown in FIG. 7A, laser source 700 includes a seed laser 702, a power pump 706, and an amplifier 708. One or more control signals 701 are provided as inputs to power pump 706 and seed laser 702. Based on the control signals 701, seed laser 702 and pump 706 generate seed laser light 703 and pump light 705, respectively. Seed laser light 703 and pump light 705 are combined and provided to amplifier 708. Using the energy provided by pump light 705, amplifier 708 amplifies seed laser light 703 and outputs amplified laser light 707 at the desired signal wavelength.

The control signals 701 can include a first control signal for controlling the power pump 706 and a second control signal for controlling the triggering frequency of the seed laser 702. Typically, the first control signal and the second control signal are changed together at the same time. The waveforms in FIG. 7B illustrate a scenario where the output of the fiber laser is switched to have a lower pulse energy and/or repetition rate. For example, based on the first control signal, the pump 706 is controlled to increase the pump power. At the same time, the seed laser 702 is controlled to switch from a low triggering frequency to a high triggering frequency based on the second control signal. In the waveform diagram shown FIG. 7B, the horizontal axis represents time and the vertical axis represents signal intensity. Waveform 722 represents the first control signal, which changes from a low value to a high value at a certain time, indicating that the pump 706 is controlled to increase the pump power (e.g., double the pump power). Waveform 724 represents the seed laser light 703. At the same time when the pump 706 increases the pump power, the seed laser 702 is controlled to change to a higher triggering frequency (e.g., from 300 kHZ to 600 kHz). Waveform 726 represents the amplifier laser light 707 at the output of the fiber laser amplifier 708. The amplified laser light 707 may have large pulse energy fluctuations (e.g., more than 40%) before it can settle or become stable again. Moreover, amplified laser light 707 may have a slow settling time (e.g., more than 120 s). In other words, the output of the fiber laser 700 cannot rapidly respond to its input changes.

FIG. 7C illustrates another scenario where the output of the fiber laser is changed to have a higher pulse energy and/or repetition rate. In this scenario, the pump 706 is controlled to decrease the pump power based on the first control signal. At the same time when pump 706 decreases its pump power, the seed laser 702 is switched from a high triggering frequency to a low triggering frequency based on the second control signal. In the waveform diagram shown FIG. 7C, the horizontal axis represents time and the vertical axis represents signal intensity. Waveform 732 represents the first control signal, which changes from a high value to a low value at a certain time, indicating that the pump 706 is controlled to decrease the pump power (e.g., reducing the pump power by 50%). Waveform 734 represents the seed laser light 703. At the same time when the pump 706 decreases its pump power, the seed laser 702 is controlled to change to a lower triggering frequency (e.g., from 600 kHZ to 300 kHz). Waveform 736 represents the amplifier laser light 707 at the output of the fiber laser amplifier. In this scenario, the amplified laser light 707 may also have large signal fluctuations (e.g., more than 40%) before it can settle or become stable again. Moreover, amplified laser light 707 may have a slow settling time (e.g., more than 120 μs). In other words, in this scenario, the output of the fiber laser 700 also cannot rapidly respond to its input changes.

Methods and systems provided in the present disclosure can reduce the output pulse energy fluctuations and shorted the settling time of the pulse energy fluctuations. As a result, the output amplifier laser light can respond rapidly to the input changes including changing the seed laser's triggering frequency and/or changing of the pump power. The rapid fiber laser output response facilitates a LiDAR system to switch, smoothly and rapidly, between scanning a region-of-interest (ROI) area and scanning a non-ROI area. Further, the rapid fiber laser output response can also improve the fiber laser efficiency and reduce unnecessary energy consumption. The methods and systems are described in greater detail below.

Figure 8:
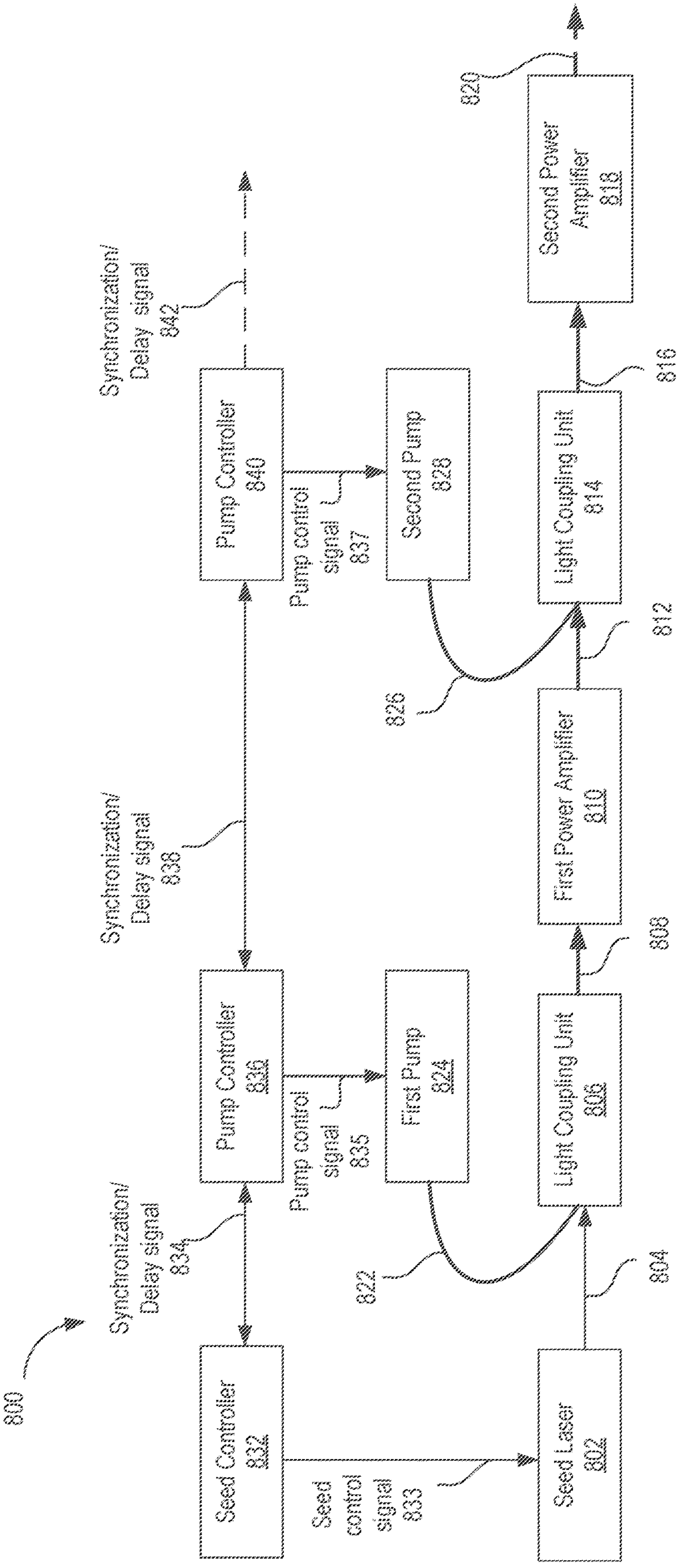
FIG. 8 is a block diagram illustrating a system for performing dynamic pulse control of a fiber laser, according to some embodiments.

FIG. 8 is a block diagram illustrating a system 800 for performing dynamic pulse control of a fiber laser. In some embodiments, system 800 includes a seed laser 802, a seed laser controller 832, a first pump 824, a pump controller 836, a light coupling unit 806, and a first power amplifier 810. Seed laser 802 can be for example, a master oscillator in a MOPA (master oscillator and power amplifier). Seed laser 802 generates seed laser light 804, which has a desired signal wavelength (e.g., 1030 nm, 1064 nm, 1530 nm, 1550 nm, 2 μm, or the like). In some embodiments, the seed laser light 804 comprises continuous wave laser light. In some embodiments, the seed laser light 804 comprises pulsed laser light. Seed laser 802 is controlled by seed controller 832. Seed controller 832 can include one or more processors and memory, and can be implemented by using, for example, field programmable gate array (FPGA), digital signal processor (DSP), etc. In one embodiment, seed controller 832 can be a part of control circuitry 350 shown in FIG. 3. Seed controller 832 can control seed laser 802 using a seed control signal 833. Seed control signal 833 can be a voltage signal, a current signal, an analog signal, a digital signal, or a combination thereof.

In some embodiments, seed controller 832 can control seed laser 802 to increase or decrease the triggering frequency of seed laser 802. The triggering frequency is a frequency at which the seed laser generates or fires the seed laser light. The triggering frequency is sometimes also referred to as the pulse repetition rate (PRR) for a pulsed laser. The higher the triggering frequency, the more frequent the seed laser fires light pulses. Therefore, the higher the triggering frequency, the higher the energy consumption of the seed laser. In some embodiments, the triggering frequency of the seed laser 802 can be increased from 300 KHz to 600 KHz, or decreased from 600 KHz to 300 KHz. It is understood that the triggering frequency can be configured to change to any desired value.

First pump 824 is configured to provide pump laser light 822 using, for example, one or more laser diodes. The laser diodes can form an array of diodes to provide sufficient pump power. Pump laser light 822 can have any desired wavelength (e.g., 915 nm, 940 nm, 980 nm, 1530 nm, or the like). First pump 924 can be, for example, a 400 mW single mode pump. First pump 924 is controlled by a pump controller 836 by using a pump control signal 835. For example, pump controller 836 can send pump control signal 835 to first pump 824 to increase the pump power, decrease the pump power, turn on the pump power, or turn off the pump power. The pump power is generated and delivered to light coupling unit 806 using pump laser light 822. In some embodiments, light coupling unit 806 is optional or integrated with first power amplifier 810. Thus, the seed laser light 804 and pump laser light 822 can be delivered directly to first power amplifier 810.

In some embodiments, seed laser light 804 and pump laser light 822 are provided to light coupling unit 806. Light coupling unit 806 combines seed laser light 804 and pump laser light 804. The combined light is delivered to first power amplifier 810, which includes a power amplification medium. In one example, the power amplification medium can be a fiber-based amplification medium, which comprises single mode fibers, large mode area (LMA) fibers, double-clad fibers, or the like. The fiber-based amplification medium may include an active gain medium such as an optical fiber doped with rare-earth elements including erbium, ytterbium, neodymium, dysprosium, praseodymium, thulium and/or holmium. In some embodiments, a fiber-based amplification medium included in first power amplifier 810 is based on double-clad fibers, in which the gain medium forms the core of the fiber surrounded by two layers of cladding. The double-clad fiber allows the core to be pumped with a high-power beam, thereby enabling a laser source to be a high-power fiber laser source. Amplification can be achieved by stimulated emission of photons from dopant ions in the doped optical fiber used in first power amplifier 810. In particular, the pump power provided by first pump 824 excites ions into an upper energy level from where they can decay via stimulated emission of a photon at the desired signal wavelength back to a lower energy level. As a result, first power amplifier 810 amplifies the seed laser light 804 to generate the first amplified laser light 812. The first amplified laser light 812 can be provided to other components of a LiDAR system (e.g., provided to transmitter 320 shown in FIG. 3).

In the above-described embodiment, a first stage amplification is performed to seed laser light 804 using first power amplifier 810. In some embodiments, system 800 is configured to provide multiple-stage amplifications. FIG. 8 illustrates a two-stage amplification system. The above described seed controller 832, seed laser 802, pump controller 836, first pump 824, light coupling unit 806, and first power amplifier 810 can be collectively used as the first amplification stage. As shown in FIG. 8, the second amplification stage can include a second pump 828, a pump controller 840, a light coupling unit 814, and a second power amplifier 818. Second pump 828 and its pump controller 840 can be the same or similar to first pump 824 and pump controller 836, respectively, as described above and thus are not repeatedly described. Pump controller 840 can send a pump control signal 837 to second pump 828, thereby controlling the second pump 828 to generate pump laser light 826. Pump laser light 826 can have any desired wavelength (e.g., 915 nm, 940 nm, 980 nm, 1530 nm, or the like). In one embodiment, first amplified laser light 812 and pump laser light 826 are delivered to light coupling unit 814. Light coupling unit 814 combines first amplified laser light 812 and pump laser light 826 and delivers the combined light 816 to second power amplifier 818. In some embodiments, first amplified laser light 812 and pump laser light 826 are delivered directly to second power amplifier 818 when, for example, the light coupling unit 814 is optional or integrated into second power amplifier 818.

Similar to first power amplifier 810, second power amplifier 818 includes a power amplification medium. In one example, the power amplification medium can be a fiber-based amplification medium, which comprises single mode fibers, large mode area (LMA) fibers, double-clad fibers, or the like. The fiber-based amplification medium may include an active gain medium such as an optical fiber doped with rare-earth elements including erbium, ytterbium, neodymium, dysprosium, praseodymium, thulium and/or holmium. In some embodiments, the fiber-based amplification medium included in second power amplifier 818 is based on double-clad fibers, in which the gain medium forms the core of the fiber surrounded by two layers of cladding. The double-clad fiber allows the core to be pumped with a high-power beam, thereby enabling a laser source to be a high-power fiber laser source. Amplification can be achieved by stimulated emission of photons from dopant ions in the doped optical fiber used in second power amplifier 818. In particular, the pump power provided by second pump 828 excites ions into an upper energy level from where they can decay via stimulated emission of a photon at the desired signal wavelength back to a lower energy level. As a result, second power amplifier 818 further amplifies first amplified laser light 812 to generate the second amplified laser light 820. The second amplified laser light 820 can be provided to other components of a LiDAR system (e.g., provided to transmitter 320 shown in FIG. 3).

The two-stage amplification system as shown in FIG. 8 can provide higher power gain than a one-stage amplification system. In some embodiments, a two-stage amplification system has better linearity and less noise amplification in each of the amplification stages. This is because, to achieve the same overall power gain, the gain of each stage of a two-stage amplification system can be lower than that of a one-stage amplification system. It is understood that system 800 can be expanded, in a similar manner as described above and as shown in FIG. 8, to include one or more additional power amplification stages (not shown).

As described above, a typical laser source (e.g., laser source 700) may have large output signal fluctuations (e.g., pulse energy fluctuations) and a slow settling time when its inputs change. System 800 can be configured to reduce the such fluctuations and shorten the settling time of the output signals. In one example shown in FIG. 9A, switching the pump power and adjusting the seed laser light can be timed to occur at different times. In particular, with reference to FIGS. 8 and 9A, seed laser 802 may be operating at a certain triggering frequency but need to be adjusted to a different triggering frequency. Correspondingly, first pump 824 may need to be switched to a lower pump power. In some embodiments, system 800 can be configured such that pump controller 836 transmits pump control signal 835 to switch the pump power of the first pump 824 at a time that is before or after the seed controller 832 transmits seed control signal 833 to adjust the triggering frequency of seed laser 802.

Figure 9A:
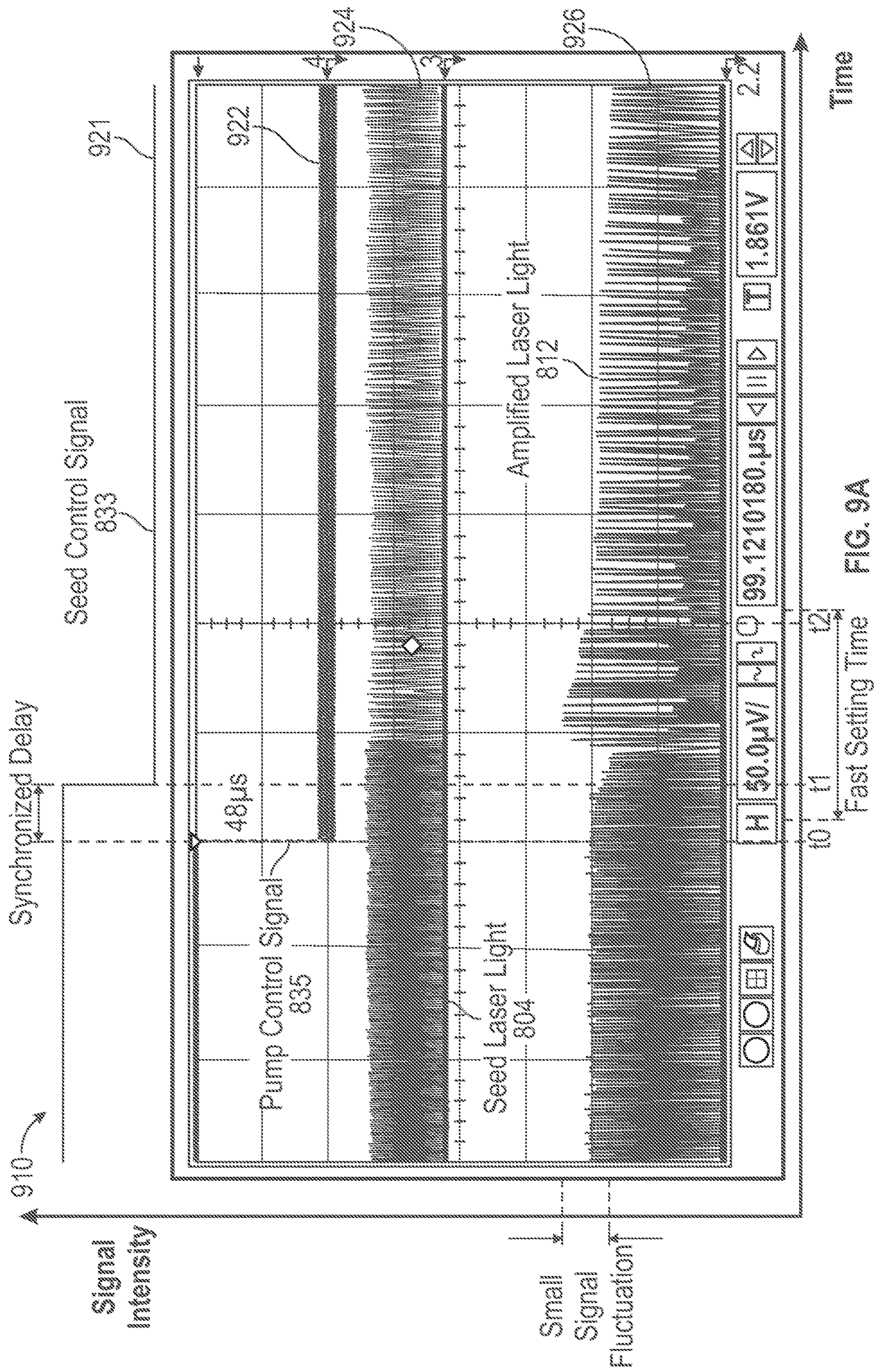
FIGS. 9A-9B are example waveforms of a seed control signal, a pump control signal, and the fiber laser output signal, according to some embodiments.

FIG. 9A illustrates a scenario where switching the pump power occurs before adjusting the triggering frequency of the seed laser. In FIG. 9A, waveform 921 represents the seed control signal 833; waveform 922 represents the pump control signal 835; waveform 924 represents seed laser light 804; and waveform 926 represents first amplifier laser light 812. FIG. 9A illustrates that at time to, pump control signal 835 changes from a high value to a low value, thereby controlling first pump 824 to switch the pump power from a high power state to a low power state. For instance, the first pump 824 may be controlled to reduce the pump power by 50%. In another example, the first pump 824 may be controlled to turn off such that no pump power is provided. At time t1, the seed control signal 833 changes from a high value to a low value, causing the seed laser 802 to adjust from a first triggering frequency to a second triggering frequency. The first triggering frequency is higher than the second triggering frequency. As shown in FIG. 9A, waveform 924 illustrates that at time t1, the seed laser light 804 changes from a high triggering frequency (e.g., 600 KHz) to a low triggering frequency (e.g., 300 KHz). In one example, the time difference between time t0 and time t1 is configured to be about 48 μs. Thus, a time difference is introduced between the time of switching the pump power and the time of adjusting the triggering frequency of the seed laser. The time difference is sometimes also referred to as a synchronized delay because the switching of seed control signal 833 is delayed from switching the pump control signal 835.

As described above, the pump power is delivered to first power amplifier 810 in the form of pump laser light 822. The seed laser light 804 is also delivered to first power amplifier 810. First power amplifier 810 amplifies the seed laser light 804 using the pump power. As a result of the time difference between the time of switching the pump power and the time of adjusting the triggering frequency of the seed laser, the output signals of first amplified laser light 812 can have smaller signal fluctuations and a faster settling time. For example, compared to the conventional method, which switches the pump power and adjusts the seed laser triggering frequency at the same time, the time difference can result in a reduction of the output pulse energy fluctuations (e.g., the pulse energy fluctuations of amplified laser light 812 may be reduced from about 40% to 12%). In addition, the time difference also can also result in a reduction of the settling time (e.g., by about 50%) of amplifier laser light 812.

The settling time can be determined by calculating the time difference between t0 and t2. In one embodiment, t0 denotes the time the pump control signal switches; and t2 denotes, for example, the time when the power amplifier output settles to within about 10% of its stable signal intensity value. The fluctuation of the power amplifier output signal can be determined by, for example, calculating an intensity difference between the maximum signal intensity value and the minimum signal intensity value during the settling time (e.g., from t0 to t2); and then dividing the intensity difference by the minimum signal intensity value. Therefore, if $I_{max}$ denotes the maximum signal intensity value (e.g., maximum pulse energy) of the power amplifier output signal and $I_{min}$ denotes the minimum signal intensity value (e.g., the minimum pulse energy) during the settling time, the fluctuation can be calculated as $(I_{max}-I_{min})/(I_{max}+I_{min})$ and expressed using a percentage. As shown in FIG. 9A, in this example, the amplified laser light 812 first decreases to a minimum signal intensity value, then increases to a maximum intensity value, and finally decreases to settle to a final stable intensity value.

Figure 9B:
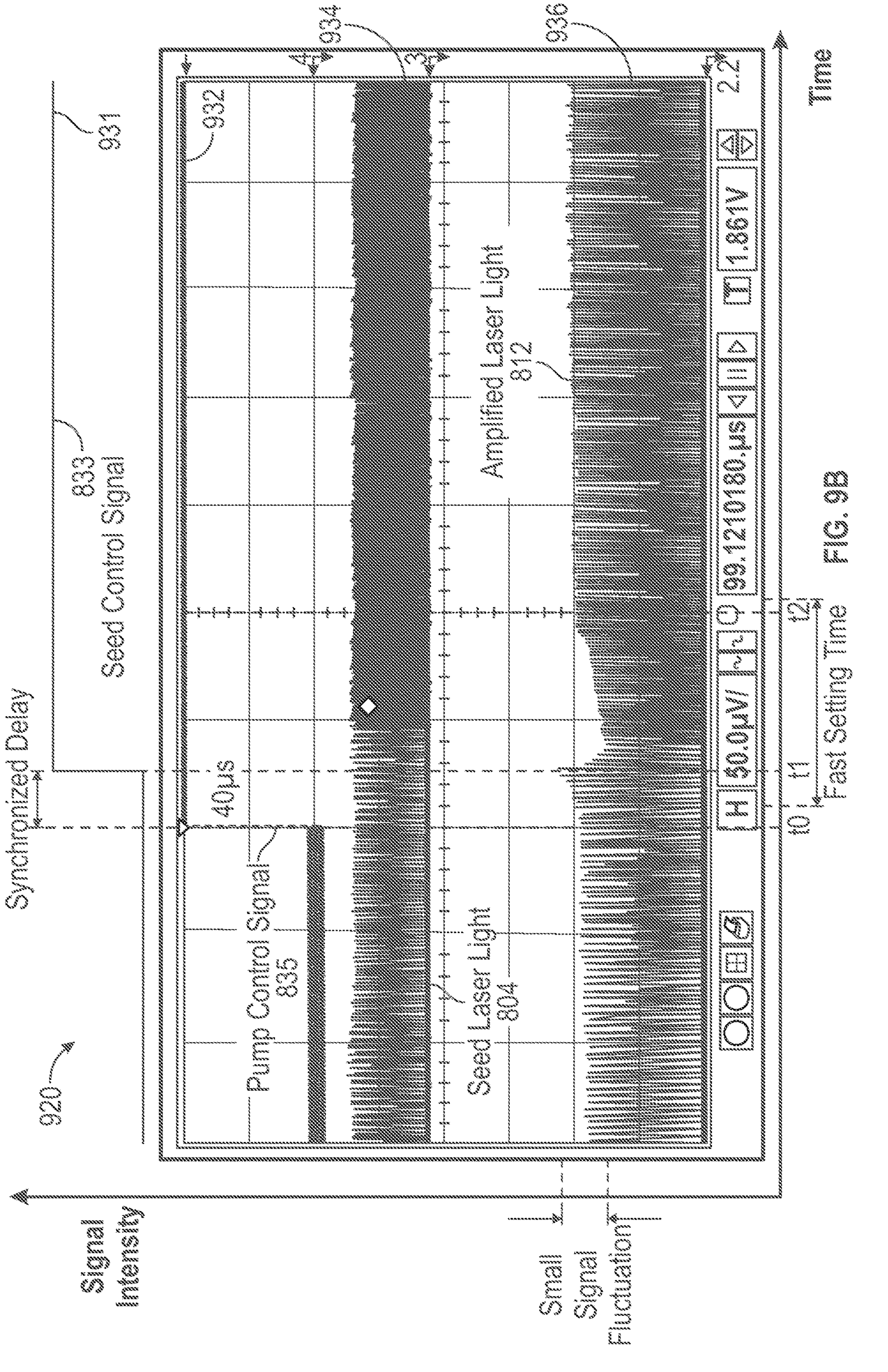

FIG. 9A illustrates the scenario where the pump power is switched from a high power state to a low power state and the corresponding seed laser is adjusted from a high triggering frequency to a low triggering frequency. FIG. 9B illustrates another scenario where the pump power is switched from a low power state to a high power state and the corresponding seed laser is adjust from a low triggering frequency to a high triggering frequency. In FIG. 9B, waveform 931 represents the seed control signal 833; waveform 932 represents the pump control signal 835; waveform 934 represents seed laser light 804; and waveform 936 represents first amplifier laser light 812. Waveform 932 in FIG. 9B illustrates that at time to, pump control signal 835 changes from a low value to a high value, thereby controlling first pump 824 to switch the pump power from a low power state to a high power state. For instance, the first pump 824 may be controlled to increase the pump power by 50%. In another example, the first pump 824 may be controlled to turn on while it was previously turned off. Waveform 931 shows that at time t1, the seed control signal 833 changes from a low value to a high value, causing the seed laser 802 to adjust from a first triggering frequency to a second triggering frequency. In this case, the first triggering frequency is lower than the second triggering frequency. As shown in FIG. 9B, waveform 934 illustrates that at time t1, the seed laser light 804 is switched from a low triggering frequency (e.g., 300 KHz) to a high triggering frequency (e.g., 600 KHz). In one example, the time difference between time t0 and time t1 is configured to be about 40 s. Thus, a time difference is introduced between the time of switching the pump power and the time of adjusting the triggering frequency of the seed laser. The time difference is sometimes also referred to as a synchronized delay because the switching of seed control signal 833 is delayed from switching the pump control signal 835.

With reference to FIG. 8 and as described above, the pump power is delivered to first power amplifier 810 in the form of pump laser light 822. The seed laser light 804 is also delivered to first power amplifier 810, which amplifies the seed laser light 804 using the pump power. As a result of the time difference between the time of switching the pump power and the time of adjusting the triggering frequency of the seed laser, first amplified laser light 812 has a smaller signal fluctuation and a faster settling time. As shown in FIG. 9B, for example, compared to the conventional method, the time difference can result in a reduction of the fluctuations of the power amplifier output (e.g., the pulse energy fluctuations of amplified laser light 812 may be reduced from about 40% to 12%). In addition, the time difference also results in a reduction of the settling time (e.g., by about 50%) of the power amplifier output. In FIG. 9B, the settling time can be determined by calculating the time difference between t0 and t2. In one embodiment, t0 denotes the time the pump control signal switches; and t2 denotes, for example, the time when the power amplifier output settles to within about 10% of the stable signal intensity value. The fluctuation of the power amplifier output signal can be determined by, for example, calculating an intensity difference between the maximum signal intensity during the settling time (e.g., from t0 to t2) and the minimum signal intensity during the settling time; and then dividing the intensity difference by the minimum signal intensity. Therefore, if $I_{max}$ denotes the maximum signal intensity (e.g., the maximum pulse energy) of the power amplifier output signal, $I_{min}$ denotes the minimum signal intensity, the fluctuation can be calculated as $(I_{max}-I_{min})/(I_{max}+I_{min})$. As shown in FIG. 9B, in this example, the amplified laser light 812 first increases to a maximum signal intensity value, then decreases to a minimum signal intensity value, and finally increases again to settle to a stable signal intensity value.

Figure 9C:
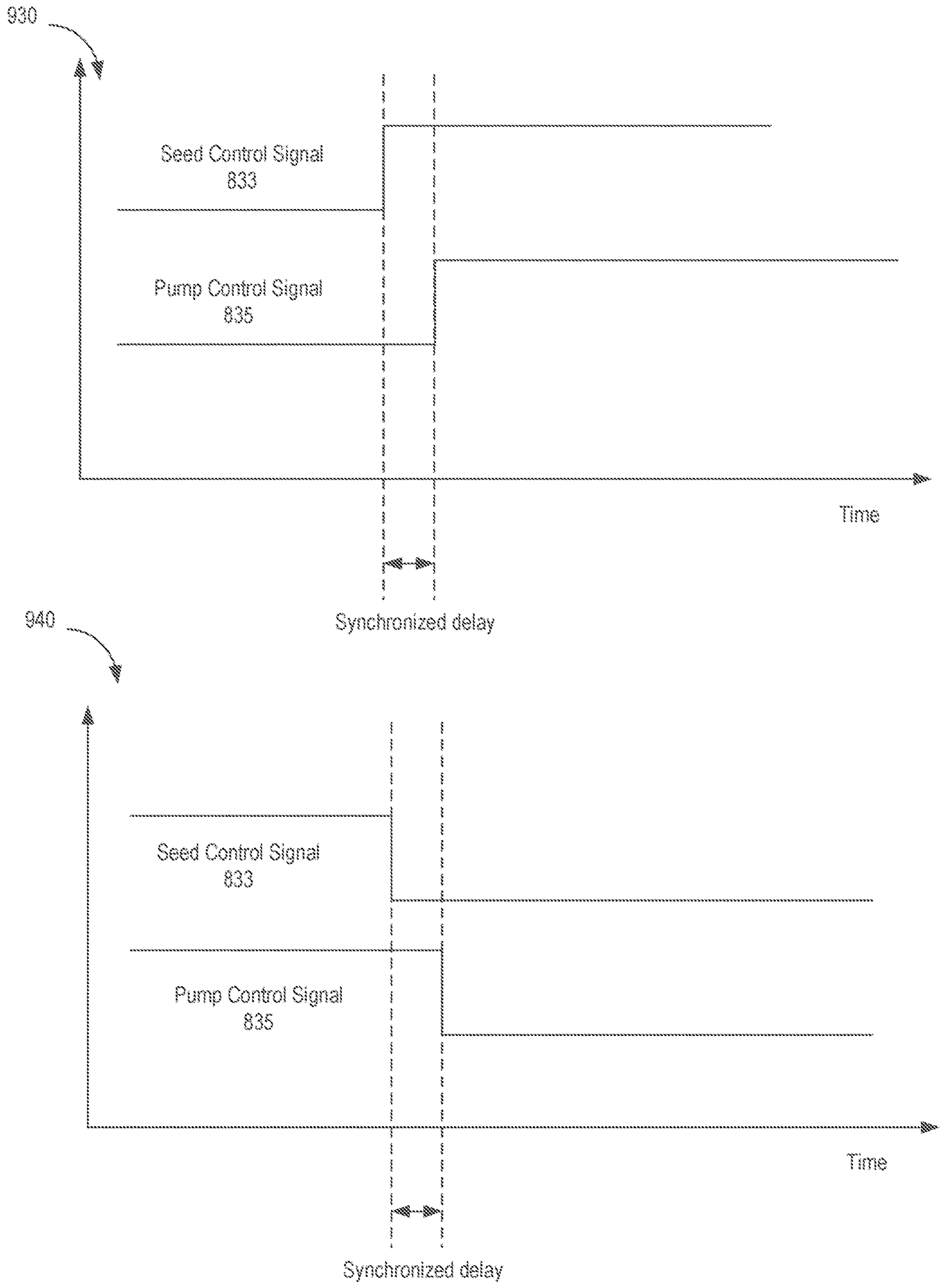
FIGS. 9C-9D are example waveforms illustrating different relations between one or more seed control signals and one or more pump control signals, according to some embodiments.

In the examples shown in FIGS. 9A and 9B above, the pump control signal 835 switches before the switching of seed control signal 833. FIG. 9C illustrates two scenarios 930 and 940 where pump control signal 835 switches after the switching of seed control signal 833. A similar time difference can be introduced. In the scenarios 930 and 940 shown in FIG. 9C, the switching of pump control signal 835 is delayed from the switching of the seed control signal 833. As a result, the seed laser 802 changes the triggering frequency (either from low to high, or from high to low) before the first pump 824 changes the pump power (correspondingly decreasing or increasing). Similarly, the time difference can result in a reduction of the fluctuation of the power amplifier output (e.g., reducing the fluctuation of amplified laser light 812 from about 40% to 12%). In addition, the time difference also results in a reduction of the settling time (e.g., by about 50%) of the power amplifier output.

With reference back to FIG. 8, the time difference can be communicated between seed controller 832 and pump controller 836 using a synchronization or delay signal 834. Synchronization signal 834 can be communicated from seed controller 832 to pump controller 836, or vice versa. For example, if seed controller signal 833 switches before the pump control signal 835 switches, seed controller 832 can communicate the synchronization signal 834 to pump controller 836. The synchronization signal 834 may include a representation of the time difference. Based on the synchronization signal 834, pump controller 836 causes the pump control signal 835 to switch after the time difference. In some embodiments, the time difference may be pre-configured and the synchronization signal 834 triggers, for example, a timer in pump controller 836, which is programmed with the time difference. In some embodiments, the time difference can be adjustable. For example, a pulse energy fluctuation monitoring and feedback circuit (not shown) can be included in system 800. The circuit can monitor the pulse energy fluctuations of amplified laser light 812. Based on the monitoring results, the time difference can be adjusted automatically to obtain optimized reduction of the pulse energy fluctuations. In some examples, the time difference can be adjusted by a user.

As another example, if pump control signal 835 switches before the switching of seed control signal 833, pump controller 836 can communicate the synchronization signal 834 to seed controller 832. The synchronization signal 834 includes a representation of the time difference. Based on synchronization signal 834, seed controller 832 causes the seed control signal 833 to switch after the time difference. In some embodiments, the time difference may be pre-configured and the synchronization signal 834 triggers, for example, a timer in seed controller 832, which is programmed with the time difference. In some embodiments, the time difference can be adjustable in a similar manner as described above. It is understood that seed controller 832 and pump controller 836 can communicate with each other regarding the synchronization signal 834 in any other desired manner.

In some embodiments, the time difference between switching the seed control signal 833 and switching the pump control signal 835 is determined based on one or both of the pulse energy fluctuation and a settling time for stabilizing the pulse energy fluctuation. As described above, the fluctuation of the signal intensity of the power amplifier output can be calculated using the maximum and minimum values of the signal intensity. In one embodiment, the signal intensity shown in FIGS. 9A and 9B may represent pulse energy for pulsed laser light. The pulse energy fluctuation can be similarly calculated. The settling time of the pulse energy fluctuation can also be calculated in a similar manner. In some embodiments, simulations and/or experiments can be performed to optimize the time difference to minimize the pulse energy fluctuation and/or the settling time. For instance, a plurality of possible time differences can be pre-selected for simulation. Multiple simulations can be performed using the possible time differences. Based on the simulation results, the pulse energy fluctuations and settling times can be calculated. Based on the calculation results, the time difference can be optimized to minimize the pulse energy fluctuation and/or the settling time.

With reference back to FIG. 8, system 800 may include two or more power amplification stages. Thus, first amplified laser light 812 generated by first power amplifier 810 can be further amplified using the power provided by a second pump 828. Similarly, a second time difference can be introduced between switching the pump control signal 835 for the first pump 824 and switching the pump control signal 837 for the second pump 828. By introducing the second time difference, the signal intensity (e.g., pulse energy) fluctuation of the output signal of the second power amplifier 818 can be reduced and its settling time can be shortened.

Figure 9D:
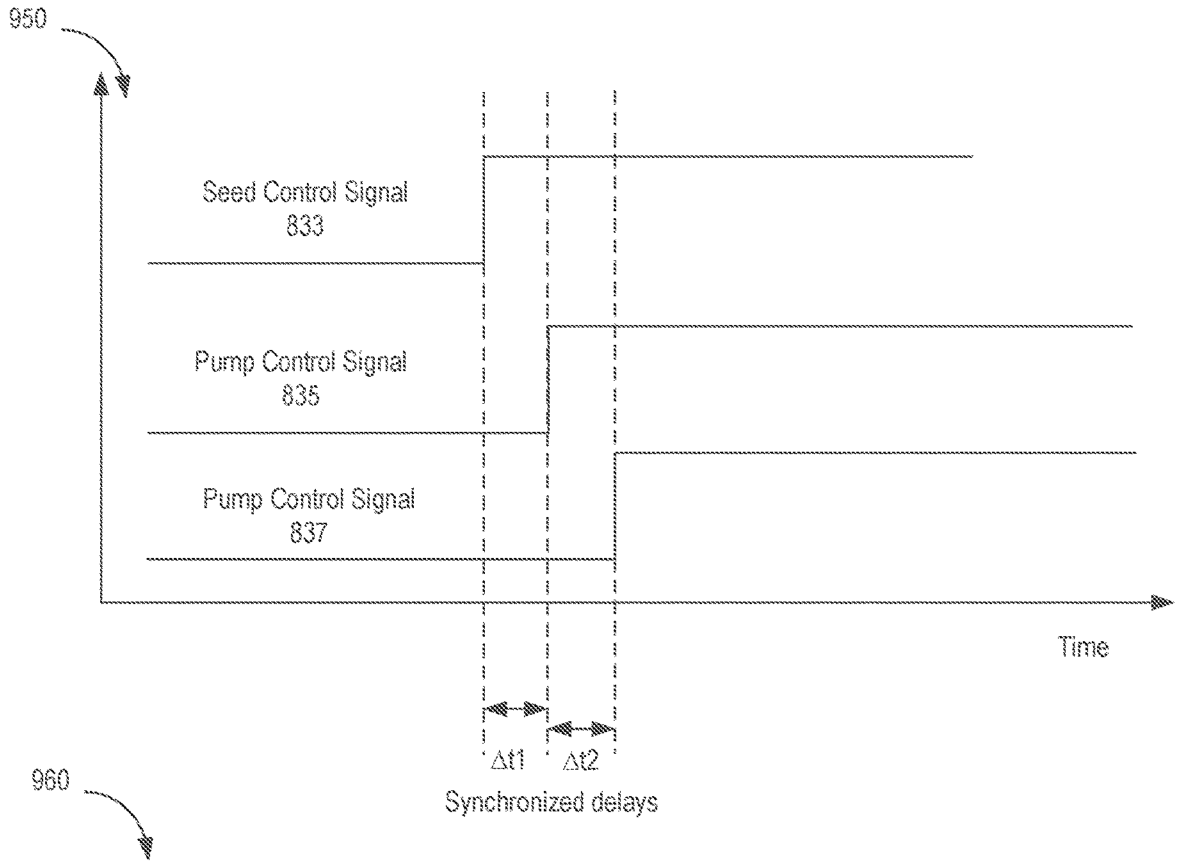
Figure 9D:
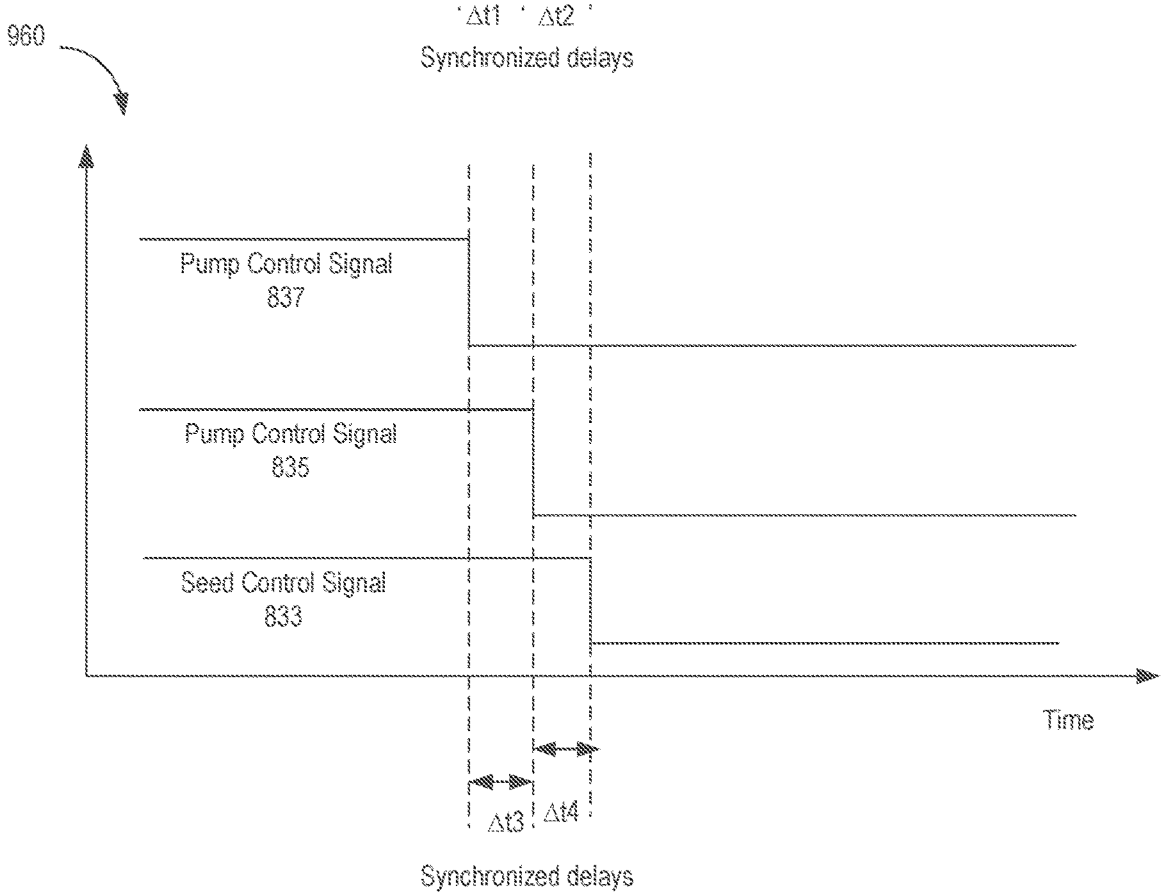

FIG. 9D shows example waveforms in two scenarios 950 and 960 for a two-stage amplification system. The waveforms illustrate relations between the seed control signal and one or more pump control signals. As shown by scenario 950 in FIG. 9D, in one embodiment, seed control signal 833 switches first (e.g., from low to high), causing the seed laser 802 to change its triggering frequency. After a time difference Δt1, pump control signal 835 switches (e.g., from low to high), thereby causing the first pump 824 to change the output pump power. Then after another time difference Δt2, pump control signal 837 switches, thereby causing the second pump 828 to change the output pump power. In a similar manner as described above, the two time differences Δt1 and Δt2 can be determined and/or optimized to minimize the pulse energy fluctuation and/or the settling time of the output signal 820 of the second power amplifier 818 (e.g., by using simulations and/or experiments). Also, in a similar manner as described above, a representation of the time differences Δt1 can be communicated between seed controller 832 and pump controller 836 using synchronization signal 834; and a representation of the time difference Δt2 can be communicated between pump controller 836 and pump controller 840 using synchronization signal 838. While scenario 950 illustrates that the signals changes from a low state to a high state, it is understood that the signals can also change from a high state to a low state with similar time differences.

Similarly, as shown by scenario 960 in FIG. 9D, in one embodiment, pump control signal 837 switches first (e.g., from high to low), causing second pump 828 to change the output power. After a time difference Δt3, pump control signal 835 switches (e.g., from high to low), thereby causing the first pump 824 to change the output pump power. Then after another time difference Δt4, seed control signal 833 switches, thereby causing the seed laser 802 to change its triggering frequency. In a similar manner as described above, the two time differences Δt3 and Δt4 can be determined and/or optimized to minimize the pulse energy fluctuation and/or the settling time of the output signal 820 of the second power amplifier 818 (e.g., by using simulations and/or experiments). Also, in a similar manner as described above, a representation of the time differences Δt3 can be communicated between pump controller 840 and pump controller 836 using synchronization signal 838; and a representation of the time difference Δt4 can be communicated between pump controller 836 and seed controller 832 using synchronization signal 834. While scenario 960 illustrates that the signals changes from a high state to a low state, it is understood that the signals can also change from a low state to a high state with similar time differences.

It is further understood that FIG. 8 and FIG. 9D illustrate the time differences and sequence of switching various control signals (seed control signal 833, pump control signals 835 and 837) for a two-stage power amplification system. Additional time differences can be introduced if system 800 include additional power amplification stages. The sequence of the switching of the control signals can be similarly configured.

Figure 10:
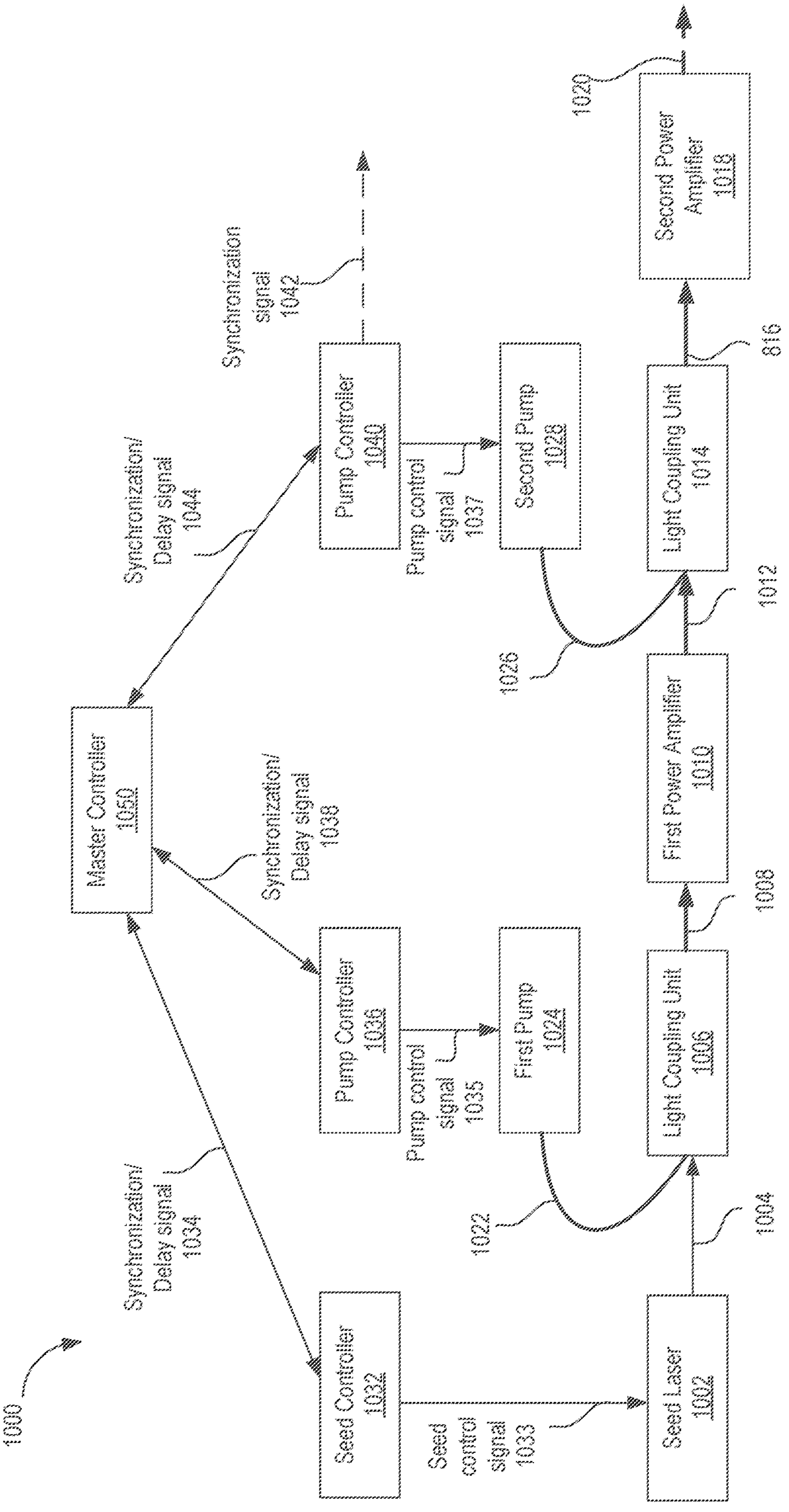
FIG. 10 is a block diagram illustrating another system for performing dynamic pulse control of a fiber laser, according to some embodiments.

FIG. 10 is a block diagram illustrating another system 1000 for performing dynamic pulse control of a fiber laser. Similar to system 800, system 1000 also include two power amplification stages. For example, the first power amplification stage of system 1000 includes seed laser 1002, seed controller 1032, first pump 1024, pump controller 1036, light coupling unit 1006, and first amplifier 1010. The second power amplification stage of system 1000 includes second pump 1028, pump controller 1050, light coupling unit 1014, and second amplifier 1018. These components are the same or similar to those corresponding components included in system 800, and are thus not repeated described. In addition, system 1000 include a master controller 1050. Master controller 1050 can include one or more processors and memory, and can be implemented by using, for example, field programmable gate array (FPGA), digital signal processor (DSP), etc. In one embodiment, master controller 1050 can be a part of control circuitry 350 shown in FIG. 3. As described above, in system 800, synchronization signals are communicated directly between the seed controller 832 and pump controller 836, and between the two pump controllers 836 and 840. System 1000 uses a master controller 1050 to communicate the synchronization signals to the seed controller and the pump controllers. A synchronization signal can be a voltage signal, a current signal, an analog signal, a digital signal, or a combination thereof.

As shown in FIG. 10, in a two-stage power amplification system, master controller 1050 communicates one or more synchronization or delay signals 1034, 1038, and 1044 to seed controller 1032, pump controller 1036, and pump controller 1040, respectively. In one example, synchronization signal 1034 causes the seed controller 1032 to switch the seed control signal 1033 (e.g., from low to high), thereby causing the seed laser 1002 to change it triggering frequency (e.g., from a low frequency to a high frequency). Synchronization signal 1038 may include a representation of a first time difference. After the first time difference, the pump controller 1036 switches the pump control signal 1035 (e.g., from low to high) based on synchronization signal 1038, thereby causing the first pump 1024 to change its output power (e.g., increase the power). Similarly, synchronization signal 1044 may include a representation of a second time difference. After the second time difference, the pump controller 1040 switches the pump control signal 1037 (e.g., from low to high) based on synchronization signal 1044, thereby causing the second pump 1028 to change its output power (e.g., increase the power).

In a similar manner, the master controller 1050 can switch the pump control signal 1037 first, followed by switching pump control signal 1035 after a third time difference, and followed by switching seed control signal 1033 after a fourth time difference. As such, the master controller 1050 can control the sequence of switching the control signals in any desired order. The time differences introduced between adjusting the triggering frequency of the seed laser and switching the one or more pump power outputs reduce the fluctuations in the output signal 1020 of the second amplifier 1018 and its settling time. It is understood that if one or more additional power amplification stages are included in system 1000, master controller 1050 can communicate one or more additional synchronization or delay signals with additional pump controllers.

Figure 11:
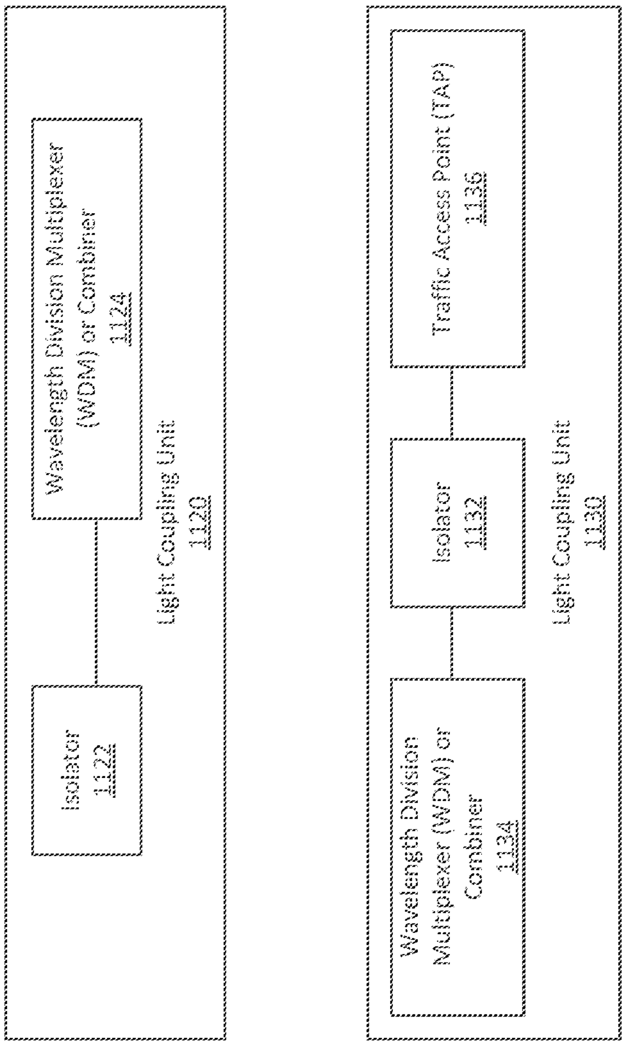
FIG. 11 are block diagrams illustrating example light coupling units, according to some embodiments.

Systems 800 and 1000 described above may both include light coupling units for combining seed laser light and a pump laser light, or for combing a first amplified laser light and a pump laser light. FIG. 11 includes block diagrams illustrating example light coupling units 1120 and 1130, which can be used to implement light coupling units 806, 814, 1006, and 1014. In one embodiment, light coupling unit 1120 includes an optical isolator 1122 and a WDM or combiner 1124. Light coupling unit 1130 includes an optical isolator 1132, a WDM or combiner 1134, and a TAP 1136. An optical isolator can pass optical signals from its input to its output but not backward. Thus, the optical isolator prevents undesired feedback or reflection. In one configuration of systems 800 and 1000, each of light coupling units 806, 814, 1006, and 1014 includes an optical isolator. As a result, the seed laser signal, the first amplified laser light 812 or 1012, and the second amplified laser light 820 or 1020 can only propagate forward, but not backward.

In one configuration of systems 800 and 1000, light coupling units 806, 814, 1006, and 1014 can each include one or more WDMs or one or more optical combiners 1124 or 1134. A WDM includes a multiplexer that multiplexes or combines multiple input optical signals and delivers the combined signals to a single optical fiber. The multiple input optical signals are carried by input laser light having different wavelengths. The input laser light having different wavelengths can be delivered by multiple input optical fibers. A WDM can also include a splitter to demultiplex or distribute the combined optical signals carried by a single optical fiber to multiple output optical signals. The multiple output optical signals are carried by output laser light having multiple wavelengths. These output laser light having multiple wavelengths can be carried by multiple output optical fibers. In some embodiments, an optical combiner can also be used in a light coupling unit instead of a WDM. An optical combiner is a passive device in which the laser light from multiple optical fibers can be combined and then distributed among one or more other optical fibers or photoreceivers.

In one configuration of system 800 and 1000, one or more light coupling units may include a TAP. A TAP is an access point that provides real-time monitoring of the optical signals.

FIG. 12 is a flowchart illustrating a method 1200 for performing dynamic pulse control of a fiber laser, according to some embodiments. In some embodiments, method 1200 begins with step 1202. In step 1202, for example, a seed laser (e.g., seed laser 802 or 1002) generates, based on a first seed control signal, seed laser light at a first triggering frequency. In step 1204, the seed laser delivers the seed laser light at the first triggering frequency to a first power amplification medium (e.g., the first power amplifier 810 or 1010).

Step 1206 determines a first time difference based on one or both of pulse energy fluctuation and a settling time for stabilizing the pulse energy fluctuation. The determination can be made by one or more controllers such as seed controller 832 or 1032, pump controllers 836, 1036, 840, or 1040, and/or master controller 1050. In some embodiments, the determination of the first time difference can be made by other hardware and/or software components or made based on a user input.

Step 1208 communicates, based on the first time difference, a first control signal between a first pump controller (pump controller 836 or 1036) and a seed controller (e.g., seed controller 832 or 1032). The communication can be initiated by the first pump controller or the seed controller. The first control signal includes a representation of the first time difference. In some embodiments, a master controller communicates one or more control signals to the seed controller and the first pump controller. At least one of the one or more control signals includes a representation of the first time difference.

In step 1210, the first pump controller switches the pump power that is deliverable to the first power amplification medium. The first power amplification medium carries the seed laser light having the first triggering frequency.

In step 1212, the seed controller adjusts, before or after the first time difference, the seed laser light to have a second triggering frequency different from the first triggering frequency. Therefore, switching the pump power and adjusting the seed laser light are timed to occur at different times having the first time difference.

In step 1214, the first power amplification medium outputs a first amplified laser light having a first wavelength. Because of the first time difference, the signal intensity fluctuations of the first amplified laser light are reduced and its settling time is shortened.

Step 1216 determines a second time difference based on one or both of pulse energy fluctuation and a settling time for stabilizing the pulse energy fluctuation. The determination can be made by one or more controllers such as seed controller 832 or 1032, pump controllers 836, 1036, 840, or 1040, and/or master controller 1050. In some embodiments, the determination of the second time difference can be made by other hardware and/or software components or made based on a user input.

Step 1218 communicates, based on the second time difference, a second control signal between a first pump controller (pump controller 836 or 1036) and a second pump controller (e.g., seed controller 840 or 1040). The communication can be initiated by the first pump controller or the second pump controller. The second control signal includes a representation of the second time difference. In some embodiments, a master controller communicates one or more control signals to the first pump controller and the second pump controller. At least one of the one or more control signals includes a representation of the second time difference.

In step 1220, the second pump controller switches the pump power that is deliverable to the second power amplification medium. The second power amplification medium carries the first amplified laser light. Therefore, switching the pump power that is deliverable to the second power amplification medium and switching the pump power that is deliverable to the first power amplification medium are timed to occur at different times having the second time difference.

In step 1222, the second power amplification medium outputs a second amplified laser light having the first wavelength. Because of the second time difference, the signal intensity fluctuations of the second amplified laser light are reduced and its settling time is shortened. It is understood that FIG. 12 illustrates an example flowchart of method 1200. Method 1200 can have additional steps, different step orders, and/or fewer steps.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for performing dynamic pulse control of a fiber laser in a light detection and ranging (LiDAR) scanning system, comprising:

switching pump power that is deliverable to a first power amplification medium, the first power amplification medium carrying seed laser light having a first triggering frequency; and adjusting the seed laser light to have a second triggering frequency different from the first triggering frequency, wherein switching the pump power and adjusting the seed laser light are timed to occur at different times having a first time difference, and the first time difference is determined based on one or both of pulse energy fluctuation of output amplified laser light and a settling time for stabilizing the pulse energy fluctuation of the output amplified laser light.

2. The method of claim 1, further comprising:

generating, based on a first seed control signal, the seed laser light at the first triggering frequency; and delivering the seed laser light at the first triggering frequency to the first power amplification medium.

3. The method of claim 1, wherein the seed laser light comprises a continuous wave laser light or a pulsed laser light.

4. The method of claim 1, wherein switching the pump power that is deliverable to the first power amplification medium comprises:

switching the pump power from a low power state to a high power state, or from an off state to an on state.

5. The method of claim 1, wherein switching the pump power that is deliverable to the first power amplification medium comprises:

switching the pump power from a high power state to a low power state, or from an on state to an off state.

6. The method of claim 1, wherein switching the pump power is timed to occur at the first time difference before adjusting the seed laser light.

7. The method of claim 1, wherein switching the pump power is timed to occur at the first time difference after adjusting the seed laser light.

8. The method of claim 1, wherein the first time difference comprises a pre-configured time difference or an adjustable time difference.

9. The method of claim 1, further comprising:

communicating, based on the first time difference, a first control signal between a first pump controller and a seed controller, wherein the first control signal causes one of adjusting the seed laser light or switching the pump power that is deliverable to the first power amplification medium.

10. The method of claim 1, wherein the second triggering frequency is higher than the first triggering frequency.

11. The method of claim 1, wherein the second trigger frequency is lower than the first triggering frequency.

12. The method of claim 1, wherein adjusting the seed laser light to have the second triggering frequency different from the first triggering frequency comprises:

generating, based on a second seed control signal, the seed laser light at the second triggering frequency; and delivering the seed laser light at the second triggering frequency to the first power amplification medium.

13. The method of claim 1, further comprising:

outputting, by the first power amplification medium, a first amplified laser light having a first wavelength.

14. The method of claim 13, further comprising:

switching pump power that is deliverable to a second power amplification medium, the second power amplification medium carrying the first amplified laser light, wherein switching the pump power that is deliverable to the second power amplification medium and switching the pump power that is deliverable to the first power amplification medium are timed to occur at different times having a second time difference.

15. The method of claim 14, wherein switching the pump power that is deliverable to the second power amplification medium is timed to occur at the second time difference before switching the pump power that is deliverable to the first power amplification medium.

16. The method of claim 14, wherein switching the pump power that is deliverable to the second power amplification medium is timed to occur at the second time difference after switching the pump power that is deliverable to the first power amplification medium.

17. The method of claim 14, further comprising:

communicating, based on the second time difference, a second control signal between a second pump controller and a first pump controller, wherein the second control signal causes one of switching the pump power of the first power amplification medium or switching the pump power that is deliverable to the second power amplification medium.

18. The method of claim 14, further comprising:

communicating, based on a plurality of time differences, respective control signals from a master controller to a seed controller, a first pump controller, and a second pump controller, wherein the seed controller, the first pump controller, and the second pump controller control adjusting the seed laser light, switching the pump power deliverable to the first power amplification medium, and switching the pump power deliverable to the second power amplification medium, respectively, based on their respective control signals.

19. The method of claim 14, further comprising:

outputting, by the second power amplification medium, a second amplified laser light having the first wavelength.

20. A system for performing dynamic pulse control of a fiber laser in a light detection and ranging (LiDAR) scanning system, comprising:

a first pump controller configured to switch pump power that is deliverable to a first power amplification medium carrying seed laser light having a first triggering frequency; and a seed controller configured to adjust the seed laser light to have a second triggering frequency different from the first triggering frequency;

wherein switching the pump power and adjusting the seed laser light are timed to occur at different times having a first time difference, and the first time difference is determined based on one or both of pulse energy fluctuation of output amplified laser light and a settling time for stabilizing the pulse energy fluctuation of the output amplified laser light.

21. A non-transitory computer readable medium storing one or more programs, the one or more programs comprising instructions, which when executed by one or more processors of an electronic device, cause the electronic device to perform a process comprising steps of:

switching pump power that is deliverable to a first power amplification medium, the first power amplification medium carrying seed laser light having a first triggering frequency; and adjusting the seed laser light to have a second triggering frequency different from the first triggering frequency, wherein switching the pump power and adjusting the seed laser light are timed to occur at different times having a first time difference, and the first time difference is determined based on one or both of pulse energy fluctuation of output amplified laser light and a settling time for stabilizing the pulse energy fluctuation of the output amplified laser light.

22. A method for performing dynamic pulse control of a fiber laser in a light detection and ranging (LiDAR) scanning system, comprising:

switching pump power that is deliverable to a first power amplification medium, the first power amplification medium carrying seed laser light having a first triggering frequency; and adjusting the seed laser light to have a second triggering frequency different from the first triggering frequency, wherein switching the pump power is timed to occur at a first time difference after adjusting the seed laser light, and the first time difference is determined by a first controller based on one or both of pulse energy fluctuation and a settling time for stabilizing the pulse energy fluctuation.

* * * * *